(12) United States Patent
Ochi

(10) Patent No.: US 9,740,405 B2
(45) Date of Patent: Aug. 22, 2017

(54) INFORMATION PROCESSING DEVICE AND INFORMATION PROCESSING SYSTEM

(71) Applicant: FUJITSU LIMITED, Kawasaki-shi, Kanagawa (JP)

(72) Inventor: Yoshiaki Ochi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 34 days.

(21) Appl. No.: 14/849,760

(22) Filed: Sep. 10, 2015

(65) Prior Publication Data

US 2016/0098192 A1    Apr. 7, 2016

(30) Foreign Application Priority Data

Oct. 1, 2014   (JP) .................. 2014-202768

(51) Int. Cl.
*G06F 12/00* (2006.01)
*G06F 3/06* (2006.01)

(52) U.S. Cl.
CPC ............ *G06F 3/061* (2013.01); *G06F 3/0635* (2013.01); *G06F 3/0656* (2013.01); *G06F 3/0682* (2013.01)

(58) Field of Classification Search
None
See application file for complete search history.

(56) References Cited

U.S. PATENT DOCUMENTS

| 6,332,197 B1* | 12/2001 | Jadav | G06F 11/1076 |
| | | | 714/6.1 |
| 2005/0086428 A1* | 4/2005 | Taniyama | G06F 3/0607 |
| | | | 711/111 |
| 2007/0088930 A1* | 4/2007 | Matsuda | G06F 12/0813 |
| | | | 711/170 |
| 2012/0011326 A1 | 1/2012 | Higashijima et al. | |

FOREIGN PATENT DOCUMENTS

| JP | 8-255418 | 10/1996 |
| JP | 2013-510360 | 3/2013 |

* cited by examiner

*Primary Examiner* — Daniel Tsui
(74) *Attorney, Agent, or Firm* — Staas & Halsey LLP

(57) ABSTRACT

An information processing device includes a processor. The processor is configured to transmit to a tape drive a write request in one of a first mode and a second mode for accompanying data. The write request in the first mode requests to store the accompanying data in a buffer memory included in the tape drive without writing the accompanying data to a magnetic tape. The write request in the second mode requests to write data stored in the buffer memory and the accompanying data to the magnetic tape. The processor is configured to transmit a write request for one of multiple pieces of data in the first mode if a remaining amount of the buffer memory is larger than a predetermined threshold value, and in the second mode if the remaining amount is equal to or smaller than the predetermined threshold value.

9 Claims, 22 Drawing Sheets

FIG. 7

| BID_CNT | 0 | 1 | 2 | 3 | 4 | 5 | 6 | 7 | ... |
|---|---|---|---|---|---|---|---|---|---|
| TM1_CNT | 0 | 0 | 0 | 0 | 1 | 1 | 1 | 2 | ... |

INFORMATION PROCESSING DEVICE AND INFORMATION PROCESSING SYSTEM

CROSS-REFERENCE TO RELATED APPLICATION

This application is based upon and claims the benefit of priority of the prior Japanese Patent Application No. 2014-202768, filed on Oct. 1, 2014, the entire contents of which are incorporated herein by reference.

FIELD

The embodiments discussed herein are related to an information processing device and an information processing system.

BACKGROUND

Magnetic tapes are widely used as low-cost and high-capacity portable recording media. For example, under the linear tape-open (LTO) Ultrium 6 standard, one tape cartridge is capable of recording 2.5 terabytes of data in an uncompressed state.

In general, in the process of recoding data in a recording medium, the data is temporarily stored in a temporary memory. As an example of a technique related to this, there is proposed an information recording system that prohibits ejection of an optical disk until completion of storage of information stored in a cache memory into the optical disk. In addition, a storage system is also proposed in which, as triggered by an event where an amount of input to and output from a target area in a cache memory falls below a certain value, the write method is switched from a write-after method to a write-through method, and then data is transferred via the cache memory.

Related techniques are disclosed in, for example, Japanese Laid-open Patent Publication No. 08-255418 and Japanese National Publication of International Patent Application No. 2013-510360.

At the start of writing data to a magnetic tape, a tape drive performs "repositioning" of positioning a magnetic head to a data writing start position in the magnetic tape. A time consumed for this repositioning accounts for a relatively large proportion of a time consumed for an entire process of writing to the magnetic tape.

In recent years, in particular, as downsizing of a tape drive proceeds, a motor to run a magnetic tape tends to produce low driving force. This poses a problem in that longer time is consumed for repositioning, and accordingly longer time is consumed for the entire process of writing to the magnetic tape.

SUMMARY

According to an aspect of the present invention, provided is an information processing device including a processor. The processor is configured to transmit to a tape drive a write request in one of a first mode and a second mode for accompanying data. The accompanying data accompanies the write request. The write request in the first mode requests to store the accompanying data in a buffer memory included in the tape drive without writing the accompanying data to a magnetic tape. The write request in the second mode requests to write data stored in the buffer memory and the accompanying data to the magnetic tape. The processor is configured to detect a remaining amount of the buffer memory. The processor is configured to transmit a write request in the first mode for one of multiple pieces of data if the remaining amount is larger than a predetermined threshold value. The processor is configured to transmit a write request in the second mode for the one of the multiple pieces of data if the remaining amount is equal to or smaller than the predetermined threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an exemplary data configuration of a BID management table;

DESCRIPTION OF EMBODIMENTS

Embodiments of the present disclosure are described hereinafter with reference to the drawings.

First Embodiment

Figure 1:
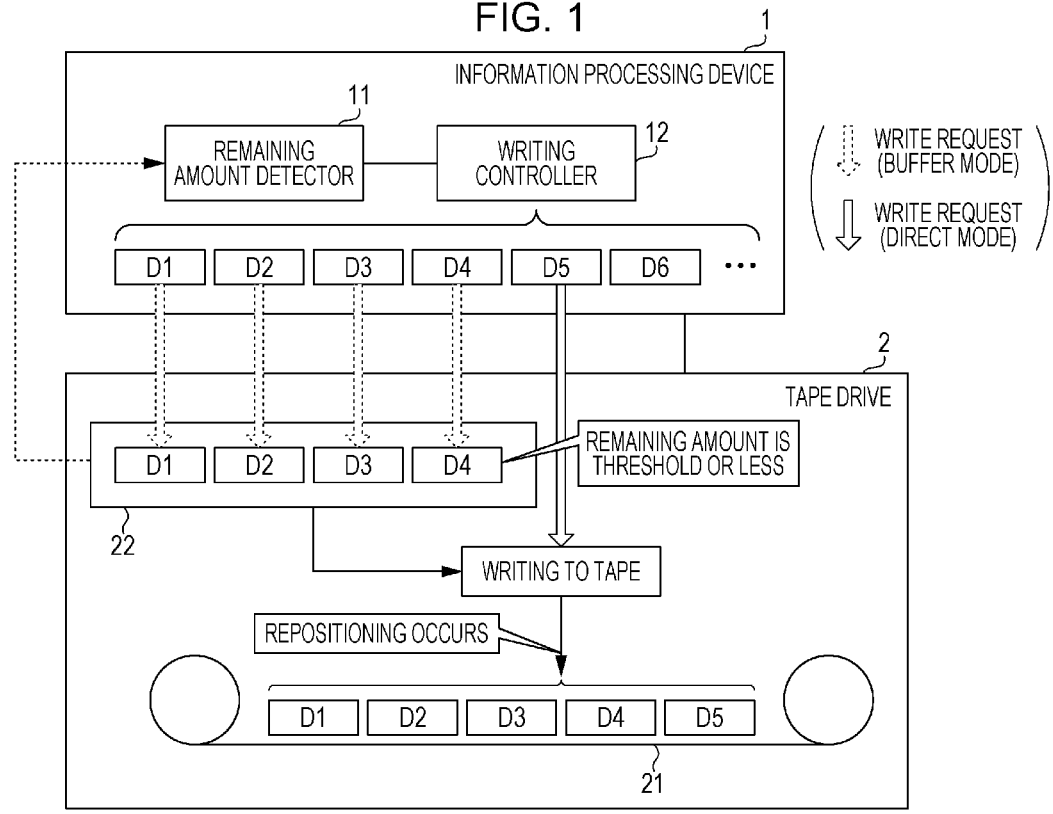
FIG. 1 is a diagram illustrating an exemplary configuration and exemplary processing of an information processing system according to a first embodiment.

FIG. 1 is a diagram illustrating an exemplary configuration and exemplary processing of an information processing system according to a first embodiment. The information processing system illustrated in FIG. 1 includes an information processing device 1 and a tape drive 2.

The tape drive 2 is configured to perform a writing/reading operation of a magnetic tape 21. The tape drive 2 includes a buffer memory 22 configured to temporarily store data which is to be written to the magnetic tape 21.

The information processing device 1 requests the tape drive 2 to write the data to the magnetic tape 21. The information processing device 1 includes a remaining amount detector 11 and a writing controller 12. Processing of the remaining amount detector 11 and the writing controller 12 is implemented by a processor included in the information processing device 1 by executing a predetermined program, for example.

The remaining amount detector 11 is configured to detect a remaining amount of the buffer memory 22 of the tape drive 2.

The writing controller 12 is configured to control writing of data to the magnetic tape 21 by transmitting a write request to the tape drive 2. In an event of requesting writing of multiple pieces of data to the magnetic tape 21, the writing controller 12 transmits a write request for each piece of data to the tape drive 2. Then, based on a detection result of a remaining amount of the buffer memory 22 by the remaining amount detector 11, the writing controller 12 performs the following processes.

In an event of transmitting a write request, if a remaining amount of the buffer memory 22 is larger than a predetermined threshold value, the writing controller 12 transmits a write request in a buffer mode (first write mode) in which data to be written is stored in the buffer memory 22 and a completion response of writing is transmitted while the data is not written to the magnetic tape 21. On the other hand, if the remaining amount of the buffer memory 22 is equal to or smaller than the above-mentioned threshold value, the writing controller 12 transmits a write request in a direct mode (second write mode) in which data stored in the buffer memory 22 and data to be written are written to the magnetic tape 21.

For example, suppose that as illustrated in FIG. 1, data D1, D2, D3, D4, D5, D6, . . . are to be written to the magnetic tape 21. In an event of requesting writing of the data D1, the writing controller 12 first checks the remaining amount of the buffer memory 22 detected by the remaining amount detector 11. If the remaining amount is larger than the threshold value, the writing controller 12 transmits a write request of the data D1 in the buffer mode. While the tape drive 2 writes the received data D1 in the buffer memory 22, the tape drive 2 notifies the writing controller 12 of completion of writing without writing the data D1 in the magnetic tape 21.

Next, in an event of requesting writing of the data D2, the writing controller 12 checks the remaining amount of the buffer memory 22 detected by the remaining amount detector 11. If the remaining amount is larger than the threshold value, the writing controller 12 transmits a write request of the data D2 in the buffer mode. In this manner, the writing controller 12 transmits a write request in the buffer mode as far as the remaining amount of the buffer memory 22 is larger than the threshold value.

Then, suppose that the remaining amount of the buffer memory 22 falls below the threshold value in an event of requesting writing of the data D5. In this state, the data D1 to D4 is stored in the buffer memory 22. The writing controller 12 transmits a write request of the data D5 in the direct mode. After performing repositioning, the tape drive 2 writes, in the magnetic tape 21, the data D1 to D4 stored in the buffer memory 22 and the data D5 transmitted from the information processing device 1 at once.

According to the first embodiment described above, the writing controller 12 transmits a data write request in the buffer mode for a maximum period during which data to be written may be stored in the buffer memory 22. When a write request is transmitted in the buffer mode, repositioning is not performed in the tape drive 2. Therefore, through processing of the writing controller 12, the number of times to perform repositioning may be reduced to the limit which is determined depending on capacity of the buffer memory 22. Consequently, the time consumed for the entire processing of writing data may be shortened.

Second Embodiment

Figure 2:
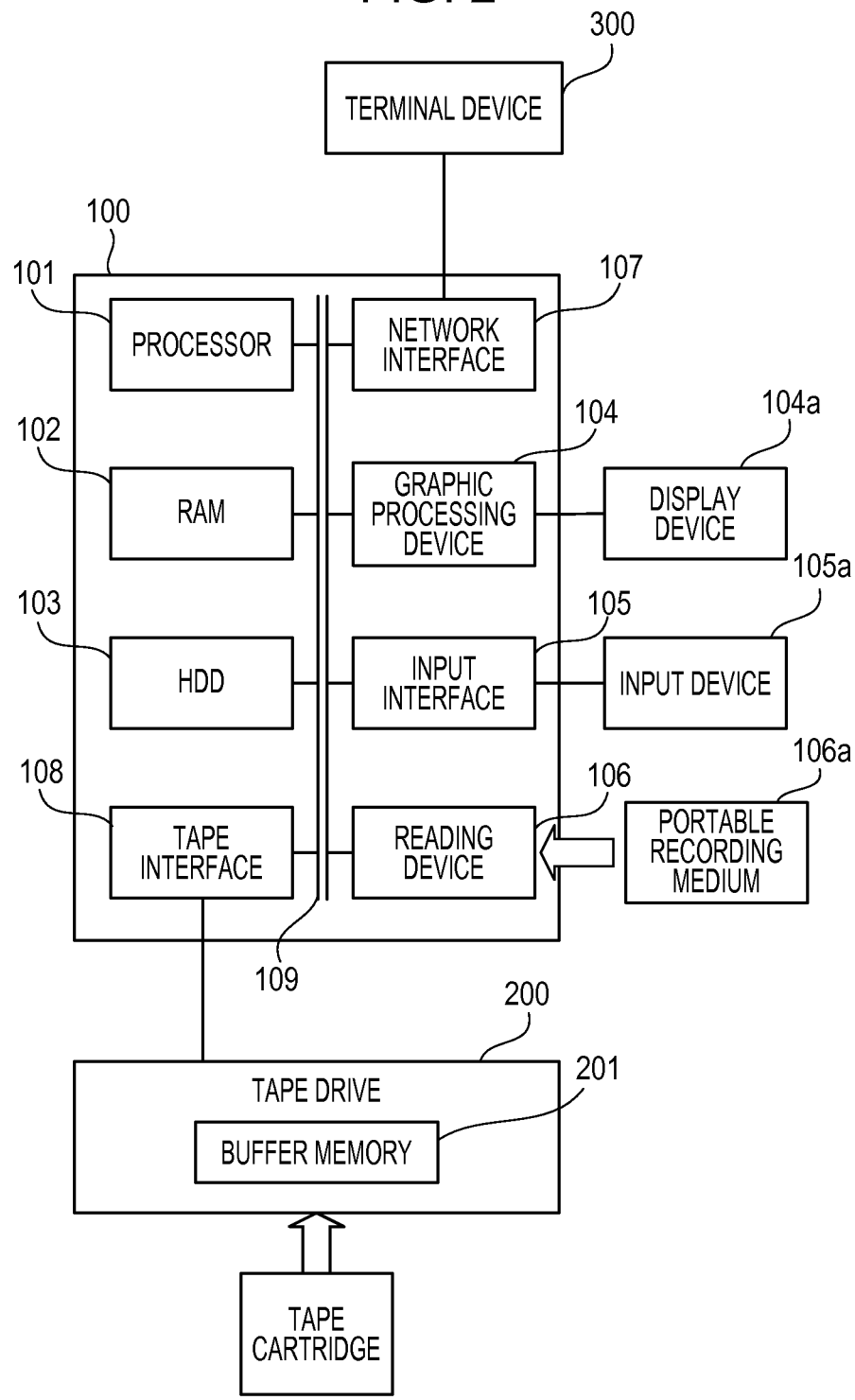
FIG. 2 is a diagram illustrating an exemplary configuration of an information processing system according to a second embodiment.

FIG. 2 is a diagram illustrating an exemplary configuration of an information processing system according to a second embodiment. The information processing system illustrated in FIG. 2 includes a server device 100, a tape drive 200, and a terminal device 300.

The server device 100 is configured to provide a user operating the terminal device 300 with predetermined services. The server device 100 also has a function to back up data stored in an internal storage area to a magnetic tape in the tape drive 200.

The tape drive 200 is configured to read and write data using the magnetic tape in a loaded tape cartridge. The tape drive 200 is capable of reading and writing data conforming to the LTO Ultrium, for example.

The tape drive 200 includes a buffer memory 201. The buffer memory 201 is implemented as a nonvolatile storage device such as a random access memory (RAM) or the like. When being requested by the server device 100 to write data to a magnetic tape, the tape drive 200 temporarily stores in the buffer memory 201 the data transmitted from the server device 100, and then writes the data from the buffer memory 201 to the magnetic tape.

The terminal device 300 is a computer to be operated by a user who is a target of services provided by the server device 100.

The server device 100 may be implemented as a computer having a hardware configuration as described below, for example.

The entire server device 100 is controlled by a processor 101. The processor 101 may be a multiprocessor. The processor 101 is, for example, a central processing unit (CPU), a micro processing unit (MPU), a digital signal processor (DSP), an application specific integrated circuit (ASIC), or a programmable logic device (PLD). The processor 101 may also be a combination of two or more elements of the CPU, the MPU, the DSP, the ASIC, and the PLD.

A RAM 102 and a plurality of peripheral devices are connected to the processor 101 via a bus 109.

The RAM 102 is used as a main storage device of the server device 100. In the RAM 102 is temporarily stored at least a part of an operating system (OS) program or an application program to be performed by the processor 101. In addition, the RAM 102 stores therein various types of data used in processing by the processor 101.

The peripheral devices connected to the bus 109 include a hard disk drive (HDD) 103, a graphic processing device 104, an input interface 105, a reading device 106, a network interface 107, and a tape interface 108.

The HDD 103 is used as an auxiliary storage device of the server device 100. The HDD 103 stores therein the OS program, the application program, and various types of data. As an auxiliary storage device, other types of nonvolatile storage device such as a solid state drive (SSD) or the like may be used.

A display device 104a is connected to the graphic processing device 104. In accordance with an instruction from the processor 101, the graphic processing device 104 displays an image on a screen of the display device 104a. A display device includes a display device using a cathode ray tube (CRT) or a liquid crystal display device or the like.

An input device 105a is connected to the input interface 105. The input interface 105 sends the processor 101 a signal outputted from the input device 105a. The input device 105a includes a keyboard, a pointing device, or the like. The pointing device includes a mouse, a touch panel, a tablet, a touch pad, a track ball, or the like.

A portable recording medium 106a is attached to or removed from the reading device 106. The reading device 106 reads data recorded in the portable recording medium 106a and transmits the data to the processor 101. The portable recording medium 106a includes an optical disk, a magneto optical disk, a semiconductor memory, or the like.

The network interface 107 transmits and receives data to and from other device such as the terminal device 300 by way of a network (not illustrated). The tape interface 108 transmits and receives data to and from the tape drive 200.

The terminal device 300 may also be implemented as a computer having a hardware configuration similar to the server device 100 of FIG. 2.

Figure 3:
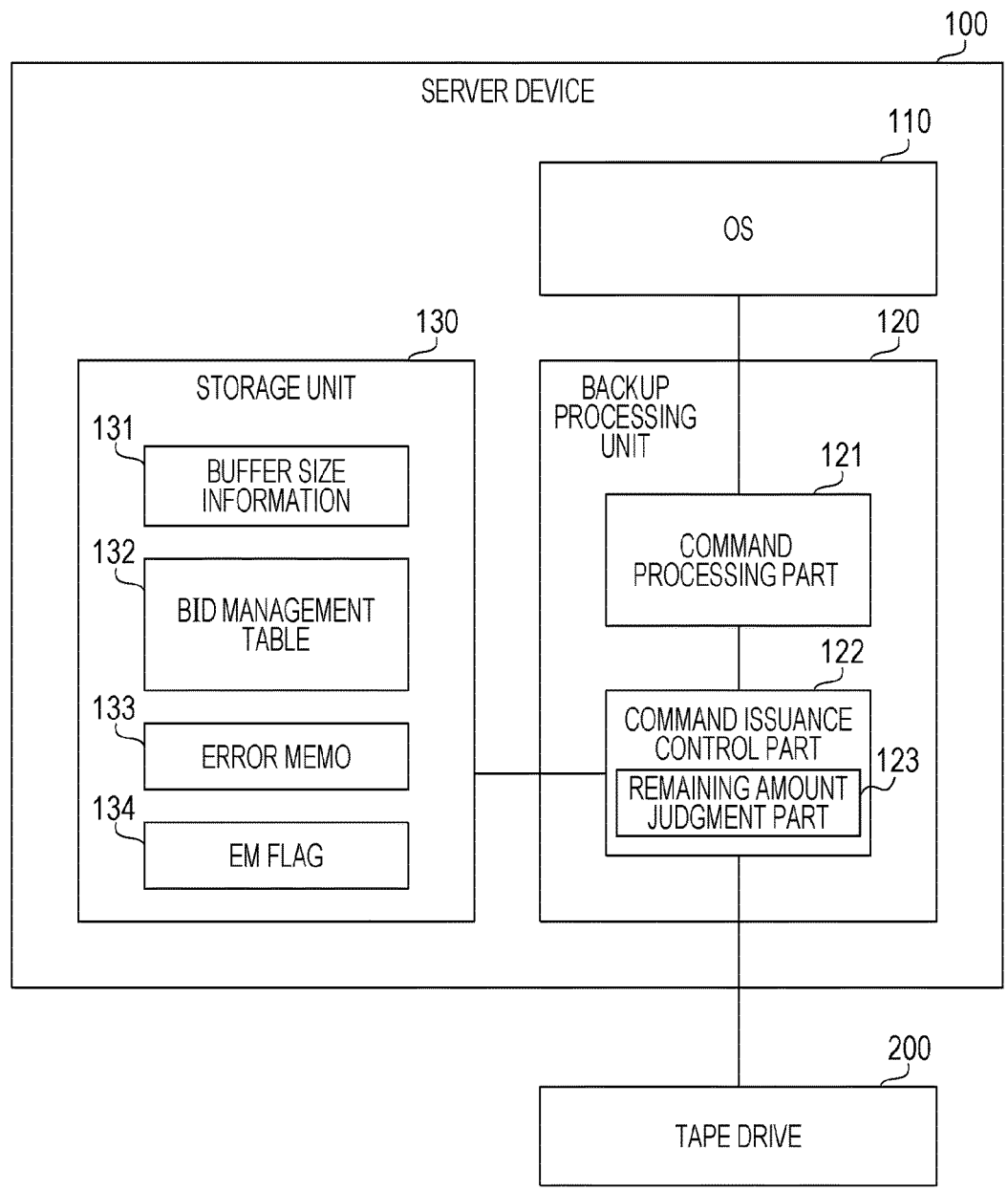
FIG. 3 is a diagram illustrating an exemplary functional configuration of a server device.

FIG. 3 is a diagram illustrating an exemplary functional configuration of a server device. The server device 100 includes an OS 110, a backup processing unit 120, and a storage unit 130.

Processing of the OS 110 is implemented by the processor 101 by executing the OS program. The OS 110 requests the backup processing unit 120 to back up predetermined data to a magnetic tape. As data to be backed up is, for example, data stored in the HDD 103 of the server device 100.

The OS 110 may request the backup processing unit 120 to back up multiple files through output of a single backup command, in some cases, and to back up one file through output of a single backup command, in other cases. In the following, a backup process to be performed in response to a request of the former may be referred to as a "backup process with multiple file designation", while a backup process to be performed in response to a request of the latter may be referred to as a "backup process with single file designation".

The OS 110 may also request the backup processing unit 120 to read data from a magnetic tape or eject a tape cartridge. Reading of data is requested by a command such as Restore or Dump, for example.

In response to a backup request from the OS 110, the backup processing unit 120 requests the tape drive 200 to write data to a loaded magnetic tape and transmits the data to be backed up to the tape drive 200. When the backup processing unit 120 is requested by the OS 110 to read data, the backup processing unit 120 requests the tape drive 200 to read the data, and hands the data read from the tape drive 200 to the OS 110.

This processing of the backup processing unit 120 is implemented by the processor 101 by executing an application program to perform a backup process, for example. The backup processing unit 120 includes a command processing part 121 and a command issuance control part 122.

The command processing part 121 is configured to convert the command received from the OS 110 into a command to be transmitted to the tape drive 200. The command processing part 121 also has a function to notify the command issuance control part 122 which of the backup process with multiple file designation and the backup process with single file designation is requested by the OS 110.

The command issuance control part 122 is configured to control a process to issue to the tape drive 200 a command converted by the command processing part 121. For example, the command issuance control part 122 adds mode information to the converted command and transmits the converted command. The mode information indicates that a process based on that command is performed in which of the buffer mode and the direct mode, to be described below.

The command issuance control part 122 includes a remaining amount judgment part 123. The remaining amount judgment part 123 is configured to calculate an estimated value of the remaining amount of the buffer memory 201 of the tape drive 200 on the basis of issuance frequency of a write request to the tape drive 200 and size of a block to be written.

The storage unit 130 is implemented by a storage area of the RAM 102 in the server device 100, for example. The storage unit 130 stores therein buffer size information 131, a BID management table 132, an error memo 133, and an EM flag 134, as information to be utilized in processing of the command issuance control part 122.

The buffer size information 131 indicates a size of the buffer memory 201 of the tape drive 200. The buffer size information 131 is stored in advance in a nonvolatile storage device (for example, the HDD 103) of the server device 100 and loaded to the RAM 102 in processing of the command issuance control part 122.

In the BID management table 132, a block identifier (ID) for identifying each block in a storage area of a magnetic tape and issuance frequency of a tm1 command, to be described below, are registered in association with each other. The BID management table 132 is used, for example, to enable recognition of a file that is successfully written in a magnetic tape when a backup process with multiple file designation is performed.

The error memo 133 registers therein a block ID of a block in a magnetic tape for which a writing error occurs when a backup process with single file designation is performed.

The EM flag 134 registers therein flag information indicating whether or not emulation of tm2 command issuance, to be described below, is performed when the backup process with single file designation is performed.

Hereinafter, processing in a case in which a backup process with multiple file designation is requested by the OS 110 is described. First of all, a comparison example of the backup process with multiple file designation and problems in that process are described with reference to FIGS. 4 and 5. Then, the backup process according to the embodiment is described with reference to FIGS. 6A and 6B and after. In the following description, a write command to be issued by the server device 100 to the tape drive 200 may be referred to as a "wr command".

Figure 4:
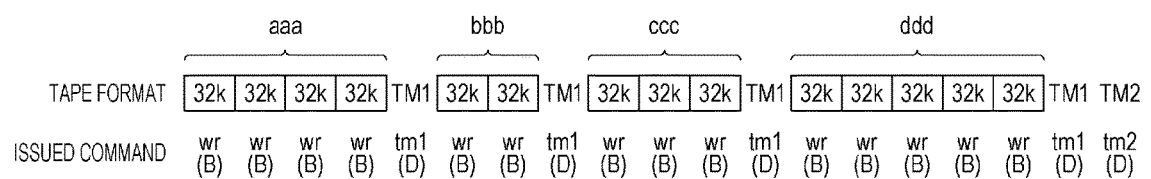
FIG. 4 is a diagram illustrating a comparison example of a backup process with multiple file designation.

FIG. 4 is a diagram illustrating a comparison example of a backup process with multiple file designation.

A request to write data to the tape drive 200 is made in the unit of a block having a predetermined size. More specifically, the backup processing unit 120 transmits a wr command to the tape drive 200 for each block. The block size is specified by the OS 110 which requests backup. In the example of FIG. 4, suppose that 32 kilobytes are specified as the block size.

In FIG. 4, in the column of "Tape Format", an exemplary configuration of data to be written to a magnetic tape in response to the above-mentioned backup command is illustrated. In the column of "Issued Command", a command name of a command issued from the backup processing unit 120 to the tape drive 200 to write to a block on a corresponding magnetic tape is illustrated. "(B)" illustrated in the column of "Issued Command" indicates that the command is issued in the buffer mode and "(D)" indicates that the command is issued in the direct mode.

In FIG. 4, by way of example, suppose that backup of four files of a file aaa, a file bbb, a file ccc, and a file ddd is requested by the OS 110 with a single backup command. The file aaa, the file bbb, the file ccc, and the file ddd are divided into blocks of 32 kilobytes and recorded in a magnetic tape. In the example of FIG. 4, suppose that the file aaa is divided into four blocks, the file bbb into two blocks, the file ccc into three blocks, and the file ddd into five blocks.

In a block following one file, a tape mark Tm1 is recorded. The tape mark Tm1 is a file tail end identifier indicating a tail end of a storage area of one file. The tape mark Tm1 is recorded in a magnetic tape in response to a tm1 command from the backup processing unit 120. In a block following the tape mark Tm1 of the last file recorded on the magnetic tape, a tape mark TM2 is recorded. The tape mark Tm2 is a data tail end identifier indicating a tail end of a storage area of the entire data recorded on the magnetic tape. In order to enable data recorded in the magnetic tape (more specifically, making the data readable by any tape drive), the tape mark Tm2 is required to be recorded at the tail end of the data storage area.

Now, the buffer mode and the direct mode are described. When a command is issued in the buffer mode, the tape drive 200 writes a corresponding block in the buffer memory 201. However, the tape drive 200 transmits a completion response to a command issuer without writing that block in a magnetic tape. On the other hand, when a command is issued in the direct mode, the tape drive 200 transmits a completion response to a command issuer after writing the requested block in a magnetic tape. If unwritten blocks are present in the buffer memory 201, the tape drive 200 writes the unwritten blocks in the buffer memory 201 to a magnetic tape, then subsequently writes the block of the received command, and transmits a completion response to the command issuer.

When a command is issued in the buffer mode, the tape drive 200 may transmit a completion response in much shorter time than when the command is issued in the direct mode. Thus, in a process to write data to the tape drive 200, rather than issuing a command to each block in the direct mode, commands are issued in the direct mode at certain intervals during which issuance of commands in the buffer mode is performed. For example, as illustrated in FIG. 4, there is a method of requesting writing of the blocks divided from a file in the buffer mode, while issuing a command in the direct mode when writing the tape mark Tm1 indicating the tail end of the writing area of one file.

Figure 5:
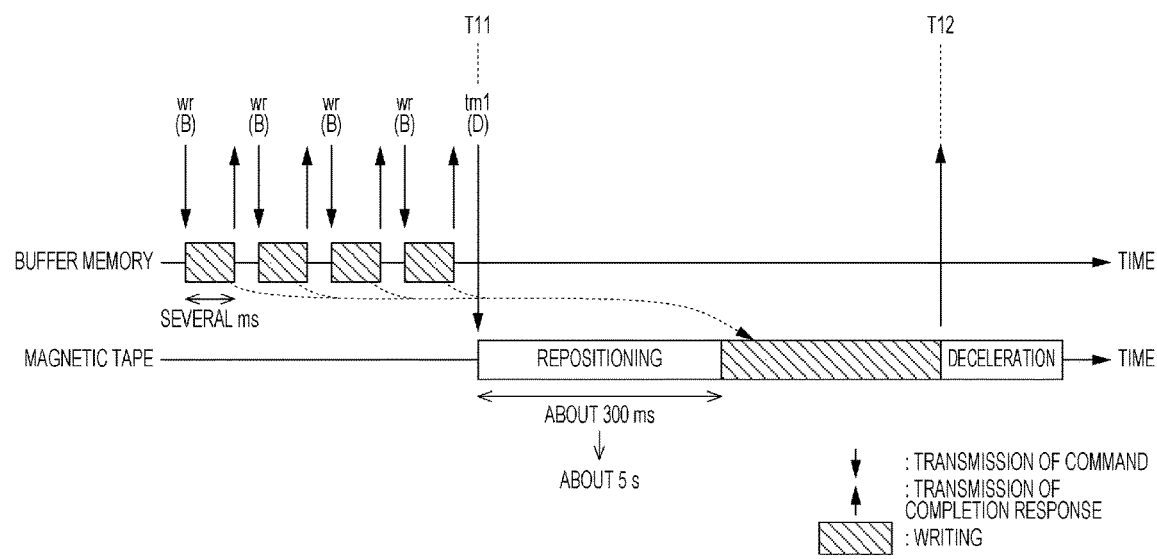
FIG. 5 is a timing chart illustrating an exemplary operation related to a buffer memory and a magnetic tape.

FIG. 5 is a timing chart illustrating an exemplary operation related to a buffer memory and a magnetic tape. A processing time in the buffer mode and the direct mode is described with reference to FIG. 5.

For example, when a wr command is issued in the buffer mode, the tape drive 200 stores a received block in the buffer memory 201 and transmits a completion response to a command issuer. Processing time from receipt of the wr command till transmission of the completion response is about several milliseconds.

Suppose that at timing T11 depicted in FIG. 5, a write request of one file ends and a tm1 command is issued in the direct mode. In this case, the tape drive 200 first performs repositioning of a magnetic tape. Repositioning is an operation of a magnetic head to accurately position to a data writing start position on a magnetic tape. Specifically, repositioning includes an operation to rewind a magnetic tape to a position which is before the data writing start position, an operation to run the magnetic tape from that position in a forward direction to accelerate a running speed till the running speed reaches a speed of writing data, or the like.

After repositioning, the tape drive 200 reads blocks from the buffer memory, writes the blocks in the magnetic tape, and writes the tape mark TM1 in the magnetic tape. At the time when these operations are completed, the tape drive 200 transmits a completion response to the command issuer (timing T12). In this manner, in the direct mode, repositioning also takes time in addition to time to write data to the magnetic tape. Thus, time from receipt of a command till response is remarkably longer than the buffer mode. After the writing to the magnetic tape ends, the tape drive 200 decelerates the running speed of the magnetic tape and stops the magnetic tape in the course of time.

As downsizing of a tape drive proceeds in recent years, downsizing of a motor for running a magnetic tape loaded in a tape drive is also under way. When a motor is downsized, power of the motor is also reduced. Thus, there is a problem that the running speed of the magnetic tape during repositioning decreases, resulting in a longer time in repositioning.

For example, in a tape drive of a cartridge magnetic tape (CMT), a time for repositioning is about 300 milliseconds. In a tape drive of LTO Ultrium in which the tape cartridge or the tape drive is made smaller, however, repositioning may take about 5 seconds, which becomes a major cause to extend the time consumed for the entire backup.

According to the second embodiment, the backup processing unit 120 performs a backup process with multiple file designation, as follows.

(1-1) While writing of each designated file is being requested, a tm1 command and a wr command are issued in the buffer mode, and only a last tm2 command is issued in the direct mode.

(1-2) However, when a remaining amount of the buffer memory 201 of the tape drive 200 falls below a predetermined amount, a command is issued in the direct mode.

Figure 6A:
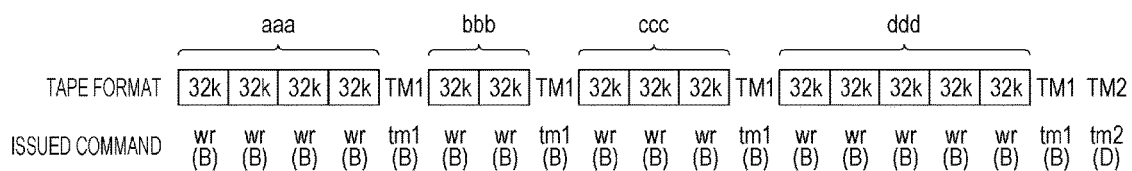
FIGS. 6A and 6B are diagrams illustrating an exemplary backup process with multiple file designation according to the second embodiment.
Figure 6B:
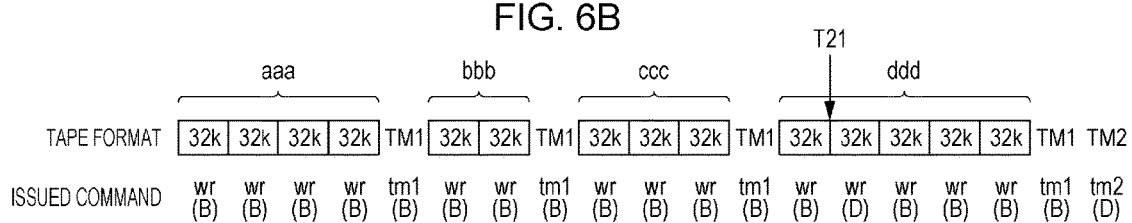

FIGS. 6A and 6B are diagrams illustrating an example of a backup process with multiple file designation according to the second embodiment. In FIGS. 6A and 6B, by way of example, suppose that similar to FIG. 4, the OS 110 requests the backup processing unit 120 to back up the four files of the file aaa, the file bbb, the file ccc, and the file ddd, with a single backup command.

Upon receiving the backup command, the command processing part 121 divides the file aaa into four blocks, the file bbb into two blocks, the file ccc into three blocks, and the file ddd into five blocks. Then, the command processing part 121 sequentially requests the command issuance control part 122 to issue a wr command for each of the four blocks of the file aaa, a TM1 command, a wr command for each of the two blocks of the file bbb, a TM1 command, a wr command for each of the three blocks of the file ccc, a TM1 command, a wr command for each of the five blocks of the file ddd, a TM1 command, and a tm2 command. With this, the command processing part 121 notifies the command issuance control part 122 that the backup process with multiple file designation is requested.

The remaining amount judgment part 123 reads a size of the buffer memory 201 of the tape drive 200, which is registered in the buffer size information 131. The command issuance control part 122 sequentially issues the commands requested to be issued to the tape drive 200 in the buffer mode. When writing of one block is requested, the remaining amount judgment part 123 calculates a remaining amount of the buffer memory 201 on the basis of a total size of blocks already requested to be written and size of the buffer memory 201.

Now, suppose that a remaining amount of the buffer memory 201 does not fall below a predetermined threshold value while writing of blocks for all files is requested. In this case, as illustrated in FIG. 6A, the command issuance control part 122 issues all commands but the last tm2 command to the tape drive 200 in the buffer mode. Then, the command issuance control part 122 issues the tm2 command to the tape drive 200 in the direct mode. In response to the issuance of the tm2 command, data accumulated in the buffer memory 201 is written to the magnetic tape. In the example of FIG. 6A, since repositioning of the magnetic tape occurs only once, the time consumed for the entire backup process is substantially reduced when compared with the example of FIG. 4.

On the other hand, if the remaining amount of the buffer memory 201 falls below the predetermined threshold value during the backup process, the following process is performed. As illustrated in FIG. 6B, for example, suppose that the remaining amount of the buffer memory 201 falls below the predetermined threshold value at timing T21 after writing of a first block of the file ddd is requested.

In this case, the command issuance control part 122 issues all commands prior to the timing T21 to the tape drive 200 in the buffer mode. Then, when the command issuance control part 122 determines that the remaining amount of the buffer memory 201 falls below the predetermined threshold value at the timing T21, the command issuance control part 122 issues to the tape drive 200 a wr command to request writing of a next block in the direct mode. With this, data accumulated in the buffer memory 201 is written to the magnetic tape and a second block of the file ddd transmitted from the command issuance control part 122 is also written to the magnetic tape.

The command issuance control part 122 issues a command to request writing of subsequent blocks, to the tape drive 200 in the buffer mode. Then, the command issuance control part 122 issues the last tm2 command to the tape drive 200 in the direct mode.

As in the example of FIG. 6B illustrated above, until the remaining amount of the buffer memory 201 falls below the threshold value, the command issuance control part 122 issues a command in the buffer mode. Then, when the remaining amount falls below the threshold value, the command issuance control part 122 issues a next command in the direct mode to cause writing to the magnetic tape to be performed. This may avoid the situation in which a block requested to be written overflows from the buffer memory 201 and is lost, while minimizing the number of occurrences of repositioning. Therefore, both of reduction of the backup time and ensuring of reliability of data writing may be achieved at a higher level.

New problems when a backup process is performed as in FIGS. 6A and 6B above are described in the following.

In some cases, the tape drive 200 may fail to write data to a magnetic tape. In the example of FIG. 4, a writing process to a magnetic tape is generated for each file. Thus, when the tape drive 200 notifies the backup processing unit 120 that the writing to the magnetic tape fails, the backup processing unit 120 may identify, on a file basis, which blocks are successfully written and which blocks are not written.

When the backup process is performed with the method in FIGS. 6A and 6B, however, the backup processing unit 120 is not capable of identifying, on a file basis, the successfully written blocks and the failed blocks. For example, suppose that at the timing T21 of FIG. 6B, when the wr command is issued in the direct mode, a writing error occurs in the tape drive 200. In this case, the command issuance control part 122 is not capable of distinguishing which of the file aaa, the file bbb, and the file ccc that are transmitted to the tape drive 200 before the writing error are successfully written to the magnetic tape. Thus, in order to avoid file writing leakage, the command issuance control part 122 considers that writing of all of the three transmitted files fails, and has to request the tape drive 200 again to write these three files.

Even in such a situation, the command issuance control part 122 may identify, on a file basis, written blocks successfully, by further performing the following processes.

(1-3) The BID management table 132 is used to manage block IDs of blocks in a magnetic tape and a block ID of a block with which the tape mark Tm1 is written.

(1-4) When the command issuance control part 122 is notified of a writing error by the tape drive 200, the command issuance control part 122 acquires from the tape drive 200 a block ID of the block in which the writing error occurs, and identifies a successfully written file, using the acquired block ID and information registered in the BID management table 132.

Figure 7:
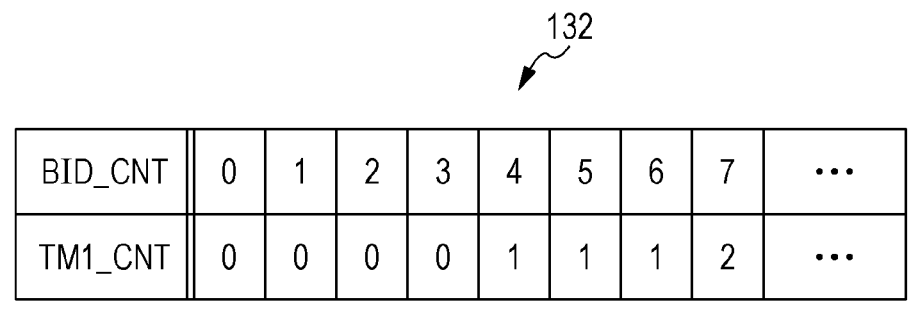

FIG. 7 is a diagram illustrating an exemplary configuration of a BID management table. A count value BID_CNT and a count value TM1_CNT are registered in the BID management table 132 in association with each other. The count value BID_CNT and the count value TM1_CNT are both counted by the command issuance control part 122 and registered in the BID management table 132.

The count value BID_CNT is a value to be counted up every time a wr command or a tm1 command is issued to the tape drive 200. Therefore, values which are incremented by 1 from the beginning are registered in the item of the count value BID_CNT.

When a backup process with multiple file designation starts, the command issuance control part 122 acquires from the tape drive 200 a block ID of a block to which a magnetic head is currently positioned. The block ID acquired here is a block ID indicating a block when the magnetic head is positioned at the tail end of the certain block. The command issuance control part 122 starts counting with the acquired block ID as an initial value of the count value BID_CNT. With this, the count value BID_CNT indicates a block ID of a writing location in the magnetic tape when the command issuance control part 122 issues a wr command or a tm1 command.

The count value TM1_CNT is a value to be counted up every time a tm1 command is issued to the tape drive 200 after the backup process with multiple file designation is started. With this, since the count value TM1_CNT is counted up when a command is issued immediately after the tape drive 200 is requested to write all blocks in one file, the count value TM1_CNT is effectively a value indicating the number of files for which the write request is made.

In the following description, a notation of BID_CNT X may be used to indicate that a value of the count value BID_CNT is X. Similarly, a notation of TM1_CNT Y may be used to indicate that a value of the count value TM1_CNT is Y.

Figure 8:
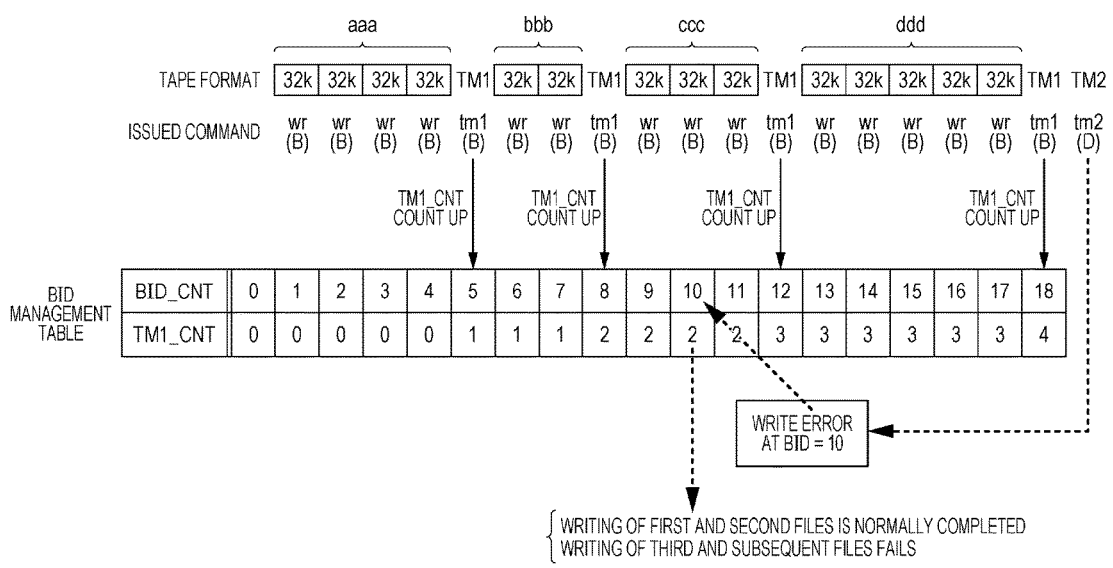
FIG. 8 is a diagram illustrating an exemplary method for judging on a successfully written file by using the BID management table.

FIG. 8 is a diagram illustrating an exemplary method for judging on a successfully written file by using the BID management table. In FIG. 8, by way of example, suppose a case in which commands are issued as in FIG. 6A. In addition, in FIG. 8, by way of example, suppose that the writing starts from the beginning of a magnetic tape. In this case, a block ID that the command issuance control part 122 acquires from the tape drive 200 when a backup process is started is "0", and an initial value of the count value BID_CNT is also "0". In the magnetic tape, data is written from a block following a leading block.

Whenever the command issuance control part 122 issues a command to the tape drive 200, the command issuance control part 122 counts up the count value BID_CNT and registers the count value BID_CNT in the BID management table 132. The command issuance control part 122 also counts up the count value TM1_CNT when a tm1 command is issued, and registers the count value TM1_CNT in the BID management table 132. With this, the count value BID_CNT and the count value TM1_CNT are associated and registered in the BID management table 132.

If the remaining amount of the buffer memory 201 does not fall below the predetermined threshold value while writing of blocks corresponding to all files is being requested, the command issuance control part 122 issues all commands but the last tm2 command to the tape drive 200 in the buffer mode. Then, the command issuance control part 122 issues a tm2 command to the tape drive 200 in the direct mode. In response to the issuance of the tm2 command, in the tape drive 200, data accumulated in the buffer memory 201 is written to the magnetic tape.

Now, for example, suppose that the tape drive 200 fails in a writing process for a block having a block ID "10". In this case, the tape drive 200 notifies the command issuance control part 122 of the writing error. The command issuance control part 122 issues a RDBID command to request a notice of a block ID of a current block to be written, to the tape drive 200. With this, the command issuance control part 122 acquires from the tape drive 200 the block ID "10" of the block for which the writing error occurs.

The command issuance control part 122 refers to the BID management table 132 and reads the count value TM1_CNT associated with the BID_CNT "10". In the example of FIG. 8, the TM1_CNT "2" is read. In this case, the command issuance control part 122 may determine that files up to the file bbb, which is the second from the beginning, are normally written in the magnetic tape and that writing of the third file and after is not completed. Therefore, the command issuance control part 122 reports to the OS 110 by way of the command processing part 121 that writing of the file aaa and the file bbb completes normally and that writing of the file ccc and the file ddd fails.

With the processing described above, while being able to reduce the backup processing time as the number of occurrences of repositioning is controlled, the command issuance control part 122 may identify, on a file basis, blocks successfully written to the magnetic tape. This avoids the situation in which actually successfully written files are rewritten to the magnetic tape, and even when a writing error to the magnetic tape occurs, time consumed for the entire backup process may be reduced.

A backup process with multiple file designation is described hereinafter with reference to a flowchart.

Figure 9:
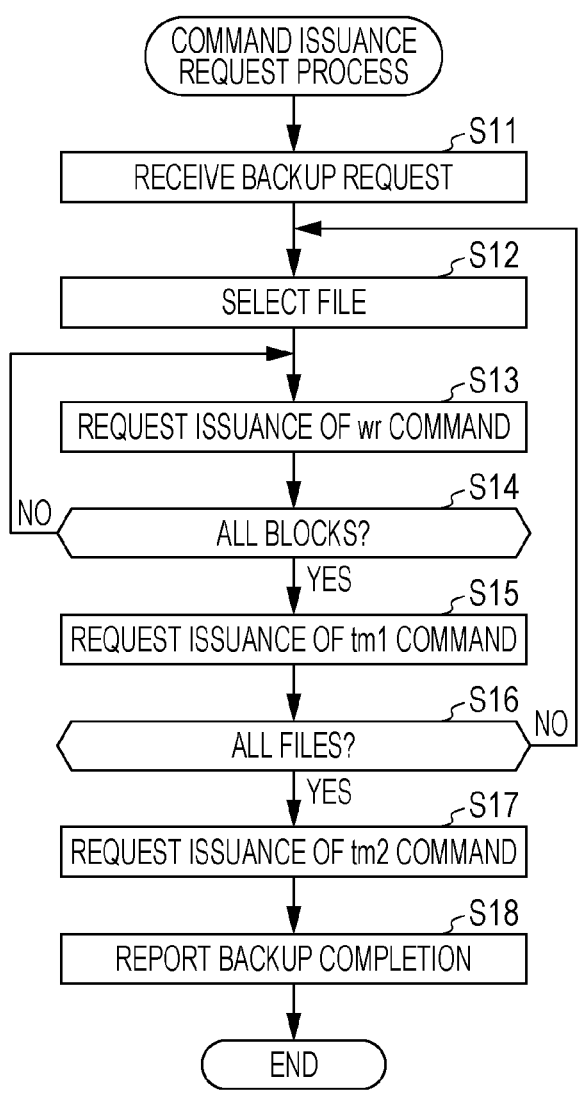
FIG. 9 is a flowchart illustrating an example of a command issuance request process.

FIG. 9 is a flowchart illustrating an example of a command issuance request process. The process in FIG. 9 is performed by the command processing part 121.

(S11) The command processing part 121 receives from the OS 110 a backup request command which designates multiple files to be backed up. A block size is specified in the received backup request command. The command processing part 121 notifies the command issuance control part 122 that the backup process with multiple file designation is requested.

(S12) The command processing part 121 selects one of files to be processed from multiple files requested to be backed up.

(S13) The command processing part 121 requests the command issuance control part 122 to issue a wr command for one of blocks obtained by dividing the selected file by block size specified in the backup request command. When the command issuance control part 122 notifies a completion response for the wr command, processing of next S14 is performed.

(S14) The command processing part 121 determines whether issuance of the wr command is requested for all blocks obtained from the file selected in S12. If there is any block for which issuance of the wr command is not requested, processing of S13 is performed. On the other hand, if issuance of the wr command is requested for all blocks, processing of S15 is performed.

(S15) The command processing part 121 requests the command issuance control part 122 to issue a tm1 command. When the command issuance control part 122 notifies a completion response for the tm1 command, processing of next S16 is performed.

(S16) The command processing part 121 determines whether all files requested to be backed up are selected. When there is any unselected file, processing of S12 is performed. On the other hand, if all files are selected, processing of S17 is performed.

(S17) The command processing part 121 requests the command issuance control part 122 to issue a tm2 command. When the command issuance control part 122 notifies a completion response of processing for the tm2 command, processing of S18 is performed.

(S18) The command processing part 121 reports to the OS 110 that the backup process is completed.

Figure 10:
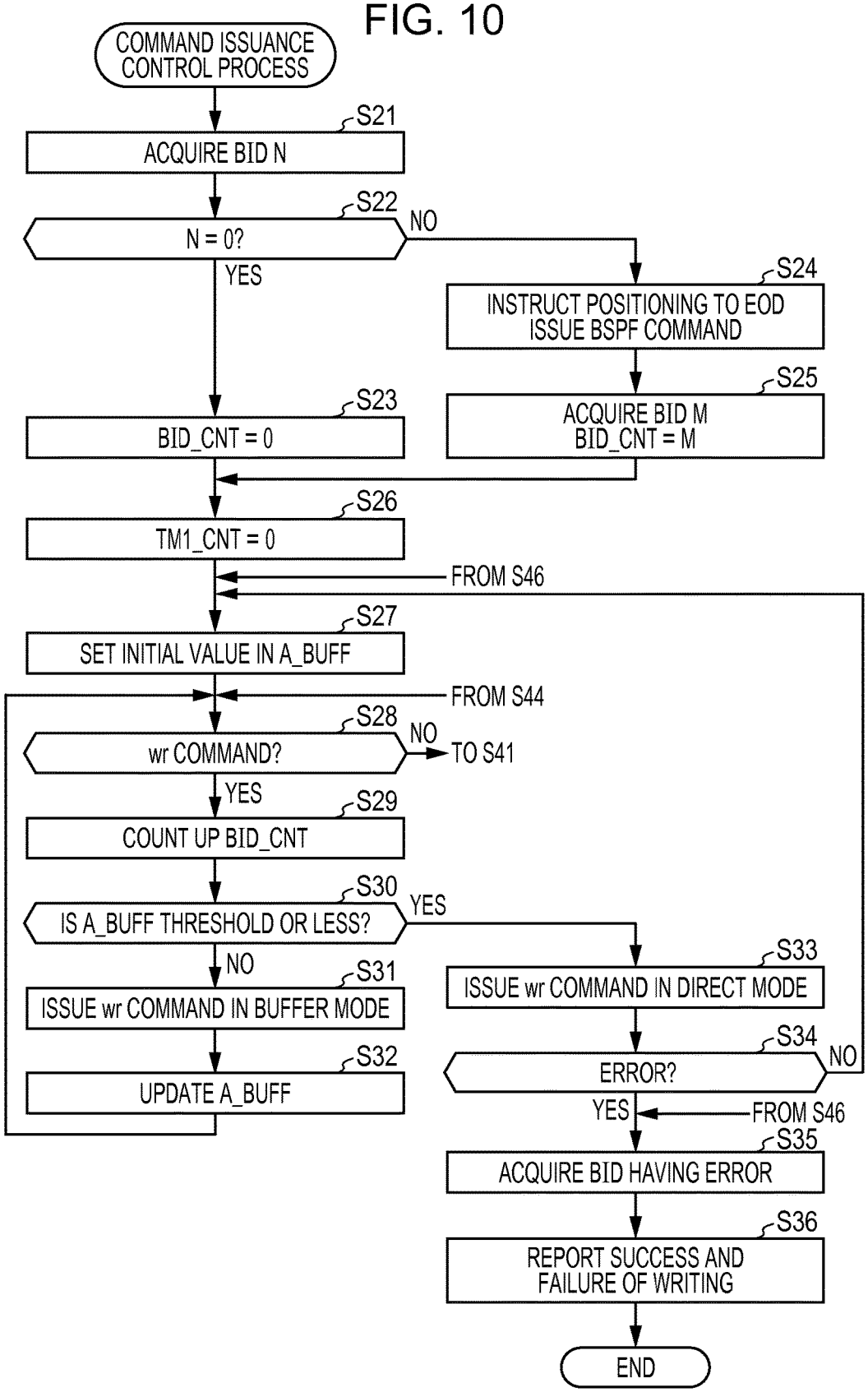
FIG. 10 is a flowchart illustrating an example of a command issuance control process.
Figure 11:
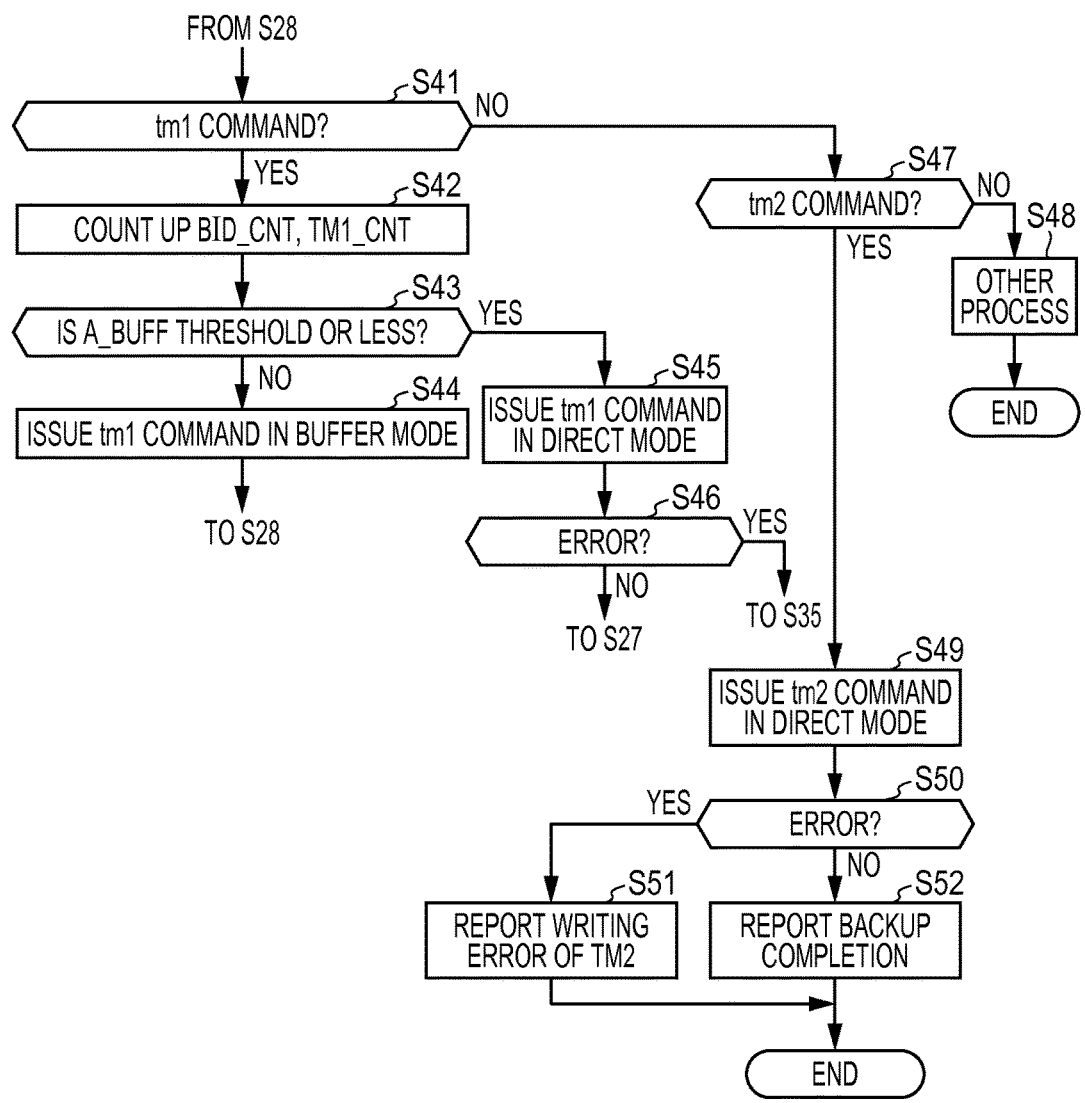
FIG. 11 is a flowchart illustrating the example of a command issuance control process.

FIGS. 10 and 11 are flowcharts illustrating an example of a command issuance control process. Processing in FIGS. 10 and 11 is performed by the command issuance control part 122.

(S21) When the command processing part 121 notifies the command issuance control part 122 that a backup process with multiple file designation is requested in S11 of FIG. 9, processing of S21 is started. The command issuance control part 122 issues a RDBID command to the tape drive 200 and acquires from the tape drive 200 a block ID indicating a current position of a magnetic head. Here, suppose that N is notified as the block ID.

(S22) The command issuance control part 122 determines whether N=0, more specifically, whether a data writing start position is the beginning of a magnetic tape. When N=0, processing of S23 is performed. If N is not "0", processing of S24 is performed.

(S23) The command issuance control part 122 sets "0" for the count value BID_CNT as an initial value.

(S24) The command issuance control part 122 issues to the tape drive 200 a command to instruct positioning of the magnetic head to an end of data (EOD). The EOD indicates a position at the tail end in a last block of blocks written in the magnetic tape.

When the block ID acquired in S21 is not "0", there is data written to the magnetic tape and a tape mark Tm2 is recorded at the tail end position. Thus, with issuance of the above-mentioned command, the magnetic head is positioned to the tail end of the block in which the tape mark Tm2 is recorded.

When receiving a completion response to the above-mentioned command, the command issuance control part 122 further issues to the tape drive 200 a backspace file (BSPF) command instructing positioning of the magnetic head to a block which is one block before a current block. With this, the magnetic head is positioned to the tail end of a block of the tape mark TM1 immediately before the tape mark TM2, so that writing may be started from a block following the tape mark TM1.

(S25) The command issuance control part 122 issues the RDBID command to the tape drive 200 and acquires from the tape drive 200 a block ID indicating a data writing start position in the magnetic tape. Here, suppose that M is notified as the block ID. The command issuance control part 122 sets M for the count value BID_CNT as an initial value.

(S26) The command issuance control part 122 sets "0" as an initial value for the count value TM1_CNT.

(S27) The remaining amount judgment part 123 reads a size of the buffer memory 201 of the tape drive 200 from the buffer size information 131. The remaining amount judgment part 123 sets a value of the size read as an initial value for a variable A_BUFF (hereinafter referred to as "remaining buffer amount A_BUFF") indicating the remaining amount of the buffer memory 201.

A size of a buffer memory may be registered for each tape drive model in the buffer size information 131. In this case, in S27, the remaining amount judgment part 123 discriminates a model of a connected tape drive and reads a size of a buffer memory corresponding to the discriminated model from the buffer size information 131.

(S28) The command issuance control part 122 receives a request to issue a command from the command processing part 121. The command issuance control part 122 determines whether the command requested to be issued is a wr command. If the command requested to be issued is a wr command, processing of S29 is performed. If the command requested to be issued is not a wr command, processing of S41 of FIG. 11 is performed.

(S29) The command issuance control part 122 counts up the count value BID_CNT and registers the count value BID_CNT after being counted up in the BID management table 132. In addition, the command issuance control part 122 registers a current count value TM1_CNT in the BID management table 132 in association with the count value BID_CNT after being counted up.

(S30) The command issuance control part 122 determines whether the remaining buffer amount A_BUFF is a threshold value or less. The threshold value is set as a value of "0" or higher. When the remaining buffer amount A_BUFF is the threshold value or less, processing of S33 is performed. When the remaining buffer amount A_BUFF is larger than the threshold value, processing of S31 is performed.

(S31) The command issuance control part 122 issues a wr command requested to be issued to the tape drive 200 in the buffer mode.

(S32) The remaining amount judgment part 123 updates the remaining buffer amount A_BUFF by subtracting a data size of one block from the current remaining buffer amount A_BUFF.

(S33) The command issuance control part 122 issues a wr command requested to be issued to the tape drive 200 in the direct mode.

(S34) The command issuance control part 122 determines, based on a response from the tape drive 200, whether a writing error to the magnetic tape occurs. When the writing error occurs, processing of S35 is performed. When the writing error does not occur and the processing for the command issued in S33 normally ends, processing of S27 is performed.

(S35) The command issuance control part 122 issues a RDBID command to the tape drive 200 and acquires from the tape drive 200 a block ID of the block for which the writing error occurs. Now, suppose that the acquired block ID is L.

(S36) The command issuance control part 122 refers to the BID management table 132 and reads the count value TM1_CNT associated with the BID_CNT L. Here, suppose that the read count value TM1_CNT is P.

The command issuance control part 122 notifies the command processing part 121 that writing of the first to $P^{th}$ files of multiple files requested to be backed up by the OS 110 succeeds and that writing of the $(P+1)^{st}$ file and after fails. Based on the notice from the command issuance control part 122, the command processing part 121 reports to the OS 110 file names of files successfully written and file names of files failed to be written.

(S41) In S28, the command issuance control part 122 determines whether the command requested to be issued is a tm1 command. If the command requested to be issued is a tm1 command, processing of S42 is performed. If the command requested to be issued is any command other than a tm1 command, processing of S47 is performed.

(S42) The command issuance control part 122 counts up the count value BID_CNT and registers the count value BID_CNT after being counted up in the BID management table 132. The command issuance control part 122 also counts up the count value TM1_CNT and registers the count value TM1_CNT after being counted up in the BID management table 132 in association with the count value BID_CNT after being counted up.

(S43) The command issuance control part 122 determines whether the remaining buffer amount A_BUFF is a predetermined threshold value or less. When the remaining buffer amount A_BUFF is the predetermined threshold value or less, processing of S45 is performed. When the remaining buffer amount A_BUFF is larger than the threshold value, processing of S44 is performed.

(S44) The command issuance control part 122 issues a TM1 command to the tape drive 200 in the buffer mode. After then, processing of S28 of FIG. 10 is performed.

Note that if the tm1 command is issued in the buffer mode, it may be considered that a size of data stored in the buffer memory 201 resulting from issuance of this command is sufficiently smaller than the size of the block obtained by dividing the file. Consequently, in the example of FIG. 10, when the tm1 command is issued in the buffer mode, the remaining buffer amount A_BUFF is not reduced.

(S45) The command issuance control part 122 issues the TM1 command to the tape drive 200 in the direct mode.

(S46) The command issuance control part 122 determines, based on a response from the tape drive 200, whether a writing error to the magnetic tape occurs. When a writing error occurs, processing of S35 of FIG. 10 is performed. When a writing error does not occur and processing for the command issued in S46 normally ends, processing of S27 of FIG. 10 is performed.

(S47) The command issuance control part 122 determines whether the command requested to be issued in S28 is a tm2 command. When the command requested to be issued is a tm2 command, processing of S49 is performed. If the command requested to be issued is any command other than a tm2 command, processing of S48 is performed (S48) The command issuance control part 122 issues the command requested to be issued to the tape drive 200 and causes processing for that command to be performed. When the processing completes, the OS 110 is notified accordingly by way of the command processing part 121 and the processing of the backup processing unit 120 ends.

(S49) The command issuance control part 122 issues a TM2 command to the tape drive 200 in the direct mode.

(S50) The command issuance control part 122 determines, based on a response from the tape drive 200, whether a writing error to the magnetic tape occurs. When a writing error occurs, processing of S51 is performed. When a writing error does not occur and processing for the command issued in S49 normally ends, processing of S52 is performed.

(S51) The command issuance control part 122 notifies the command processing part 121 that a writing error of the tape mark Tm2 occurs. The command processing part 121 reports to the OS 110 that abnormality occurs in a writing completion process of the magnetic tape, for example.

(S52) The command issuance control part 122 notifies the command processing part 121 that the writing is completed. The command processing part 121 reports to the OS 110 that the backup process of all requested files normally ends.

In the above processing, an initial value of the count value BID_CNT may be set to any value other than "0" in S25. However, for example, if the operation is such that writing always starts from the beginning of a magnetic tape, the initial value of the count value BID_CNT may be fixed to "0" and processing of S21, S22, S24, and S25 may be omitted. In other words, by making it possible to set the initial value of the count value BID_CNT to any value other than "0", as in FIG. 10, multiple files requested to be backed up may be added to a magnetic tape to which data is already written.

Processing in a case in which a backup process with single file designation is requested by the OS 110 is described hereinafter. First of all, a comparison example of the backup process with single file designation and problems in that process are described with reference to FIGS. 12 and 13. Then, the backup process according to the present embodiment is described with reference to FIG. 14 and after.

Figure 12:
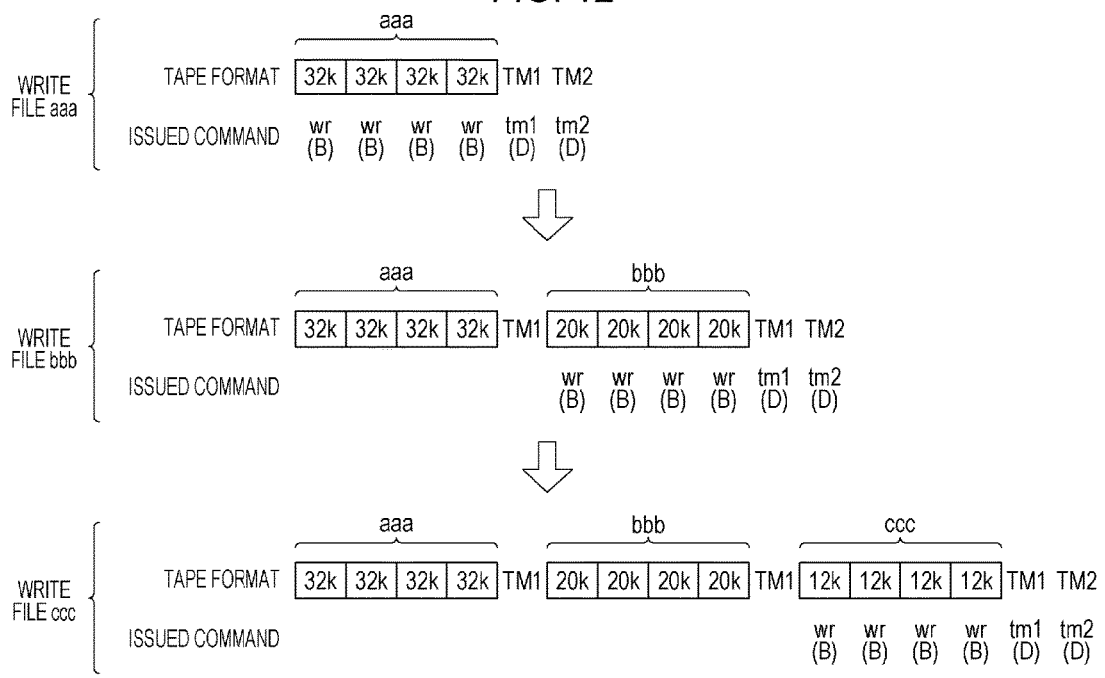
FIG. 12 is a diagram illustrating a comparison example of a backup process with single file designation.

FIG. 12 is a diagram illustrating a comparison example of a backup process with single file designation. In FIG. 12, suppose that the OS 110 requests a backup process of the file aaa, a backup process of the file bbb, and a backup process of the file ccc, respectively, with an individual backup request command. Also suppose that as a block size, 32 kilobytes are specified for the file aaa, 20 kilobytes are specified for the file bbb, and 12 kilobytes are specified for the file ccc.

When the backup processing unit 120 is requested to back up the file aaa, the backup processing unit 120 requests the tape drive 200 to write four blocks obtained by dividing the file aaa by the 32 kilobytes, with wr commands for the respective blocks. These wr commands are issued in the buffer mode. When writing of the four blocks completes, the backup processing unit 120 also requests the tape drive 200 to write tape marks Tm1 and Tm2 with a TM1 command and a tm2 command, respectively. The tm1 command and the TM2 command are issued in the direct mode. Here, writing of the tape mark Tm2 is requested because at the time when the writing of the file completes, a magnetic tape in which this file is recorded is required to be kept in a state in which the magnetic tape is also readable and writable by another tape drive.

Then, when the backup processing unit 120 is requested to back up the file bbb, the backup processing unit 120 requests the tape drive 200 to write four blocks obtained by dividing the file bbb by 20 kilobytes with wr commands for the respective blocks. These wr commands are issued in the buffer mode. When writing of the four blocks completes, the backup processing unit 120 also requests the tape drive 200 to write the tape marks Tm1 and Tm2 with a TM1 command and a tm2 command, respectively. The tm1 command and the TM2 command are issued in the direct mode.

In such backup process of the file bbb, a writing position of a leading block obtained from the file bbb is a block following the tape mark TM1, and the tape mark Tm2 is overwritten with this leading block. With this, in the magnetic tape after the writing of the file bbb is completed, the tape mark TM1 is recorded following blocks for the file aaa, and then, blocks for the file bbb is recorded. This avoids an abnormal write state in which the tape mark Tm2 is recorded between the files.

Then, when the backup processing unit 120 is requested to back up the file ccc, the backup processing unit 120 requests the tape drive 200 to write four blocks obtained by dividing the file ccc by 12 kilobytes, with wr commands for the respective blocks. These wr commands are issued in the buffer mode. When writing of the four blocks completes, the backup processing unit 120 also requests the tape drive 200 to write the tape marks Tm1 and Tm2 with a TM1 command and a tm2 command, respectively. The tm1 command and the TM2 command are issued in the direct mode.

Also in the backup process of the file ccc, similar to the case of the file bbb, a writing position of a leading block obtained from the file ccc is a block following the tape mark Tm1 and the tape mark Tm2 is overwritten with this leading block.

Figure 13:
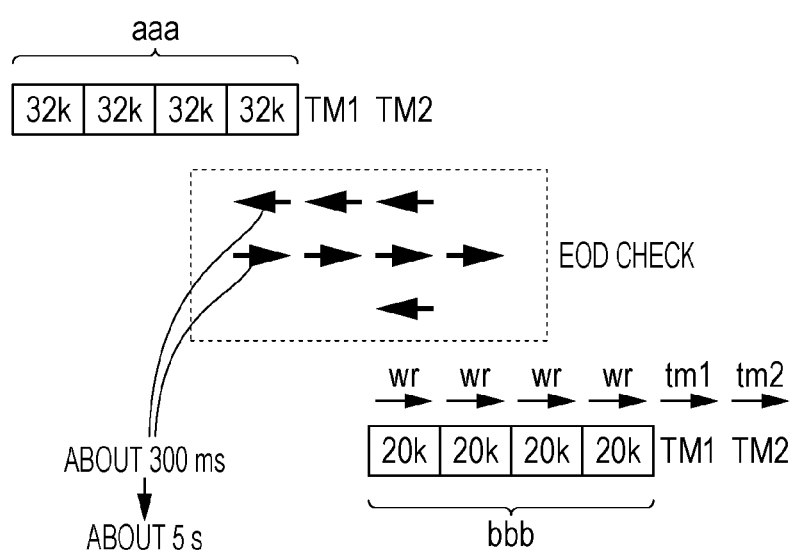
FIG. 13 is a diagram illustrating exemplary processing in a case in which one file is written to a magnetic tape and a next file follows the one file.

FIG. 13 is a diagram illustrating exemplary processing of a case in which one file is written to a magnetic tape and a next file follows the one file. In FIG. 13, by way of example, of the processing of FIG. 12, the case in which the file bbb is written after the file aaa is illustrated. Note that thick arrows depicted in FIG. 13 indicate an action of moving, by one block, a location to which the magnetic head is positioned, and directions of the thick arrows indicate the running direction of the magnetic tape (more specifically, moving to a forward direction or moving to a rewinding direction).

When a backup process is performed with a single file designation, as described above, a writing position of a leading block of a following file is a block following the tape mark Tm1 corresponding to the preceding file. In order to perform such positioning, the backup processing unit 120 requests the tape drive 200 to perform an action called "EOD check". A request for EOD check is made with a command to instruct positioning to EOD and a BSPF command, as illustrated in S24 of FIG. 10.

When the tape drive 200 is instructed to position to EOD, the tape drive 200 reads recorded contents of blocks while rewinding the magnetic tape one block by one block to detect a position of a last tail end of a file. In the example of FIG. 13, the tape drive 200 sequentially performs reading of the tape mark TM2, reading of the tape mark TM1, and reading of the tail end block of the file aaa. For each reading of these, repositioning is performed every time.

Then, in order to detect a next block position of the tape mark TM2, the tape drive 200 reads contents of respective blocks while running the magnetic tape in the forward direction. In the example of FIG. 13, the tape drive 200 performs reading of the tail end block of the file aaa, reading of the tape mark TM1, reading of the tape mark TM2, and reading of a block following the tape mark TM2. For each reading of these, repositioning is performed every time. The tape drive 200 confirms that nothing is recorded following the tape mark TM2, and positions the magnetic head to the tail end of the tape mark TM2 block, more specifically, to the EOD.

Then, in response to the BSPF command from the backup processing unit 120, the tape drive 200 positions the magnetic head to the tail end of a block of the tape mark Tm1 which is one block before. Repositioning is also performed at this positioning.

As in the example described above, when a backup process is requested for each file, repositioning occurs multiple times when a next file following one file is written. As described earlier, in recent years, the time consumed for repositioning tends to be longer. For example, in a tape drive of CMT, the time is about 300 milliseconds, while in a tape drive of LTO Ultrium, it may take about 5 seconds. Thus, there is a problem that time of the entire backup process is substantially extended because repositioning occurs multiple times.

While repositioning is performed multiple times for positioning in the above-mentioned example of FIG. 13, this is an example of processing to increase precision in positioning. In order to position a location of the magnetic head to the tail end of the tape mark Tm1 block, repositioning is required to take place at least two times, that is, repositioning to read the tape mark Tm2 and repositioning to position the magnetic head before the tape mark TM2. Due to occurrence of repositioning at least two times, the time of entire backup process is extended.

Even in such a situation, the command issuance control part 122 controls the occurrence times of repositioning when a backup process with single file designation is requested consecutively, by performing the following processes.

(2-1) The command issuance control part 122 issues, at an asynchronous timing, the tm2 command after writing one file.

(2-2) The command issuance control part 122 issues the TM2 command when a request is made to perform a process (such as restore or dump) involving reading of data from a magnetic tape, when a request is made to eject the magnetic tape, and when a timeout occurs without any requests being made for a certain period of time after issuance of a command related to backup.

(2-3) The command issuance control part 122 manages, based on the count value BID_CNT, a block ID of a block to be written in response to an issued command, and matches the block ID against a block ID acquired from the tape drive 200 when writing a new file.

If a backup process with single file designation is consecutively requested at time intervals which do not cause a timeout, issuance of aTM2 command after writing of a file is omitted with the processing in (2-1) and (2-2), and the tape mark Tm2 is no longer written to the magnetic tape. Then, a next file is written from a block following the tape mark Tm1 at the tail end of a preceding file. At this time, rewinding the magnetic tape from the position of the tape mark Tm2 to detect the tape mark Tm1 is no longer performed. Thus, repositioning is no longer performed.

By writing the tape mark Tm2 at the timing indicated in (2-2), reading or ejection may be performed, after the magnetic tape is shifted into a state in which the magnetic tape may be used normally. The process in (2-3) is a process to determine whether writing of a new file may be started without performing repositioning.

Figure 14:
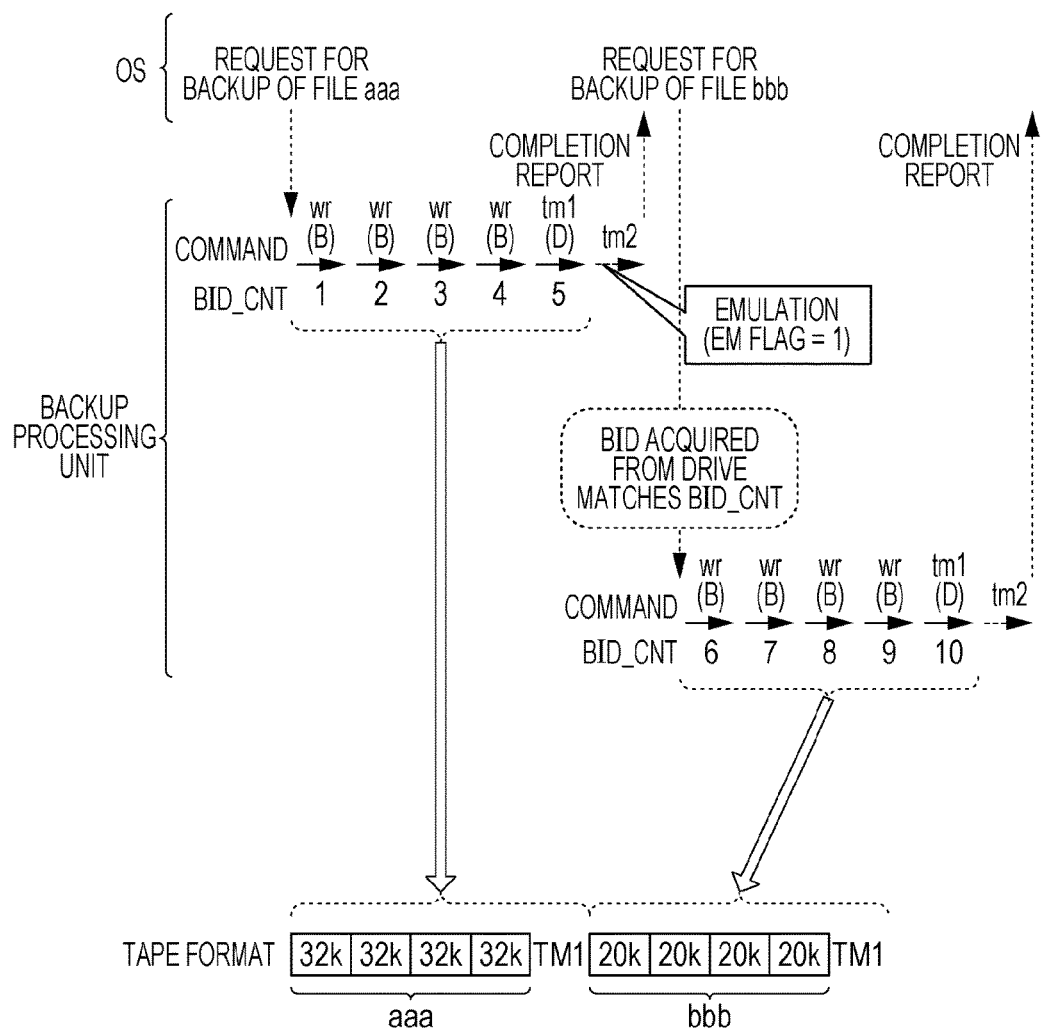
FIG. 14 is a diagram illustrating an example of a case in which issuance of a tm2 command is omitted.

FIG. 14 is a diagram illustrating an example of a case in which issuance of a tm2 command is omitted. In FIG. 14, by way of example, suppose that the OS 110 requests to back up the file aaa and the file bbb with individual backup request commands, respectively.

When the OS 110 requests to back up the file aaa, the command processing part 121 requests the command issuance control part 122 to issue wr commands for four blocks obtained from the file aaa, a tm1 command, and a tm2 command, similar to the example of FIG. 12. The command issuance control part 122 issues the four wr commands and the tm1 command to the tape drive 200 similar to the example in FIG. 12. More specifically, the four wr commands are each issued to the tape drive 200 in the buffer mode, and the tm1 command is issued to the tape drive 200 in the direct mode. With this, the four blocks obtained from the file aaa and the tape mark Tm1 are written to the magnetic tape.

The command issuance control part 122 notifies the command processing part 121 of completion of issuance of the tm2 command, without issuing the tm2 command to the tape drive 200. The command issuance control part 122 also changes an EM flag 134 to "1" instead of issuing the TM2 command. In the following, changing the EM flag 134 to "1" and notifying the command processing part 121 of the completion of issuance of tm2 command without issuing the tm2 command may be referred to as "emulation of TM2 command issuance".

When the command issuance control part 122 notifies the command processing part 121 that the issuance of the tm2 command is completed, the command processing part 121 reports to the OS 110 that the backup of the file aaa is completed. At this point of time, the four blocks obtained from the file aaa and the tape mark Tm1 are recorded in the magnetic tape, and the magnetic head is in a state of being writable from a block following the tape mark TM1.

The command issuance control part 122 counts the count value BID_CNT with a process similar to the "backup process with multiple file designation" described earlier. If writing of the file aaa is performed from the beginning of the magnetic tape, a value of the count value BID_CNT is "5" when completion of backup of the file aaa is reported to the OS 110.

Then, when the OS 110 requests to back up the file bbb, the command processing part 121 requests the command issuance control part 122 to issue wr commands for four blocks obtained from the file bbb, a TM1 command, and a tm2 command, similar to the example of FIG. 12. Upon receiving a request to issue a first wr command for the file bbb, the command issuance control part 122 performs the following processes.

The command issuance control part 122 issues a RDBID command to the tape drive 200 and acquires a block ID indicating a current position of the magnetic head. The command issuance control part 122 compares the acquired block ID with a current count value BID_CNT. If an access to the magnetic tape is not performed after the backup process of the file aaa, the acquired block ID matches the current count value BID_CNT. In this case, the tape drive 200 is in a state in which the tape drive 200 may start writing from a block following the tape mark Tm1 without performing repositioning.

Thus, the command issuance control part 122 issues the wr command requested to be issued to the tape drive 200 in the buffer mode without requesting an EOD check of the tape drive 200. The command issuance control part 122 issues the remaining wr commands to the tape drive 200 in the buffer mode and also issues a tm1 command to the tape drive 200 in the direct mode. With this, no repositioning is performed in the tape drive 200, and the four blocks obtained from the file bbb and the tape mark Tm1 are written to the magnetic tape.

Similar to the backup process of the file aaa, the command issuance control part 122 performs emulation of the tm2 command issuance also in the backup process of the file bbb. Since the EM flag 134 is already "1", this value is maintained. With this, completion of the backup of the file bbb is reported to the OS 110 without writing the tape mark Tm2 to the magnetic tape.

With the processing described above, repositioning no longer occurs in a period from when the OS 110 requests backup of the file bbb till when the OS 110 receives the completion report of the backup of the file bbb, thus reducing the time consumed for the backup of the file bbb.

When starting to write a new file, the command issuance control part 122 matches a block ID acquired from the tape drive 200 against a current count value BID_CNT. Then, when these values match, the command issuance control part 122 issues a wr command without requesting an EOD check. With this, it may be determined that writing of a new file may start from a block following the tape mark Tm1 without performing repositioning, thereby improving reliability of data writing.

Note that in the process described above, a process of the command processing part 121 to receive a backup request from the OS 110 and respond to the request is the same as the process in the comparison example of FIG. 12. This controls the number of occurrences of repositioning without changing a program for implementing the command processing part 121 and simply by adding to this program a new program for implementing the command issuance control part 122. Therefore, increase of developing cost of a program for implementing the backup processing unit 120 may be controlled.

Figure 15:
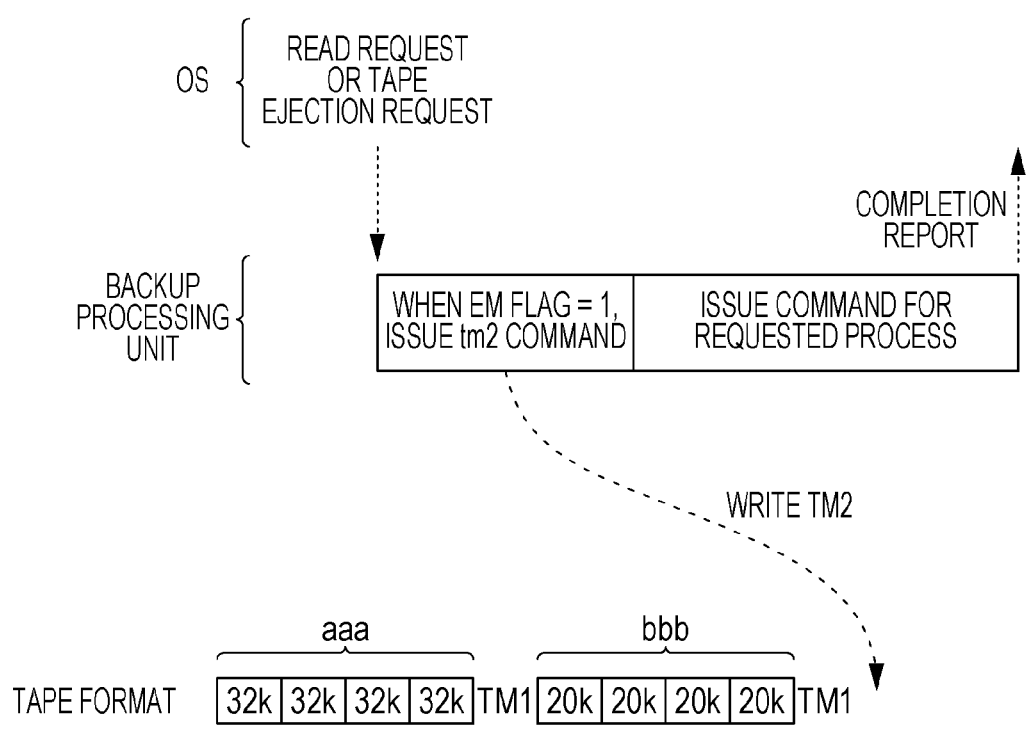
FIG. 15 is a diagram illustrating an example of timing to issue a tm2 command after emulation.

FIG. 15 is a diagram illustrating an example of timing to issue the tm2 command after emulation. When the processing illustrated in FIG. 14 ends, data is recorded in the magnetic tape in the order of the four blocks obtained from the file aaa, the tape mark TM1, the four blocks obtained from the file bbb, and the tape mark TM1. In this state, since the tape mark Tm2 is not recorded at the tail end, this magnetic tape is not in a state of being readable and writable in any tape drive. Thus, the command issuance control part 122 issues a TM2 command to the tape drive 200 to enable the magnetic tape, immediately before timing when this magnetic tape is used in any intended purpose other than the backup process.

As described in the above (2-2), a tm2 command is issued at the timing when a process (such as restore or dump) involving reading of data from a magnetic tape is requested, when ejection of the magnetic tape is requested, and when timeout occurs without any requests being made for a certain period of time after issuance of a command related to backup. In FIG. 15, by way of example, a case in which reading of data or ejection of a magnetic tape is requested is illustrated. While it is supposed here that the OS 110 requests reading of data and ejection of a tape, the request of reading of data and ejection of the tape may be made by executing other application programs, for example.

When the OS 110 requests reading of data or ejection of a tape, the command processing part 121 requests the command issuance control part 122 to issue a command to perform a process in response to the request. The command issuance control part 122 reads the EM flag 134. When the EM flag is "1", emulation of the tm2 command issuance is performed for the magnetic tape loaded in the tape drive 200, and the tape mark Tm2 is not recorded in this magnetic tape. In this case, the command issuance control part 122 issues a tm2 command to the tape drive 200. With this, the tape mark Tm2 is written to the tail end of the area of the magnetic tape where the data is recorded, and this magnetic tape is enabled.

Upon receiving a notice that writing of the tape mark Tm2 is normally completed, the command issuance control part 122 issues a command requested by the command processing part 121 to the tape drive 200. When reading of data is requested, data requested from the tape drive 200 is read. When ejection of the tape is requested, a tape cartridge is ejected from the tape drive 200.

When processing for the issued command is normally completed, the command issuance control part 122 notifies the command processing part 121 that the processing for the command is completed. The command processing part 121 reports to the OS 110 that the requested processing is normally completed.

Although not illustrated, when the tape drive 200 fails to write the tape mark TM2, the command issuance control part 122 registers a current count value BID_CNT in the error memo 133 and continues processing similar to the above. In this case, the process requested by the OS 110 continues without recording the tape mark Tm2 in the magnetic tape. The error memo 133 is referred to in a subsequent writing process or a reading process. The processing using the error memo 133 is described later.

A backup process with single file designation is described below, with reference to a flowchart.

Figure 16:
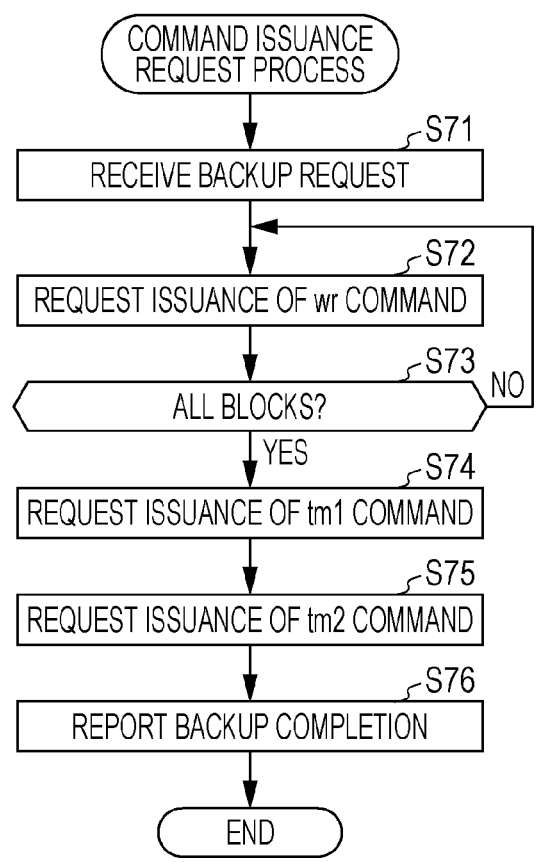
FIG. 16 is a flowchart illustrating an example of a command issuance request process.

FIG. 16 is a flowchart illustrating an example of the command issuance request process. Processing of FIG. 16 is performed by the command processing part 121.

(S71) The command processing part 121 receives from the OS 110 a backup request command with one file designated to be backed up. A block size is specified in the received backup request command. The command processing part 121 notifies the command issuance control part 122 that the backup process with single file designation is requested.

(S72) The command processing part 121 requests the command issuance control part 122 to issue a wr command for one block obtained by dividing the designated file by the specified block size. When the command issuance control part 122 notifies a completion response of processing for the wr command, processing of the following S73 is performed.

(S73) The command processing part 121 determines whether issuance of a wr command is requested for all blocks obtained from the designated file. If there is any block for which issuance of the wr command is not requested, processing of S72 is performed. On the other hand, if issuance of the wr command is requested for all blocks, processing of S74 is performed.

(S74) The command processing part 121 requests the command issuance control part 122 to issue a tm1 command. When the command issuance control part 122 notifies a completion response of the processing for the tm1 command, processing of S75 is performed.

(S75) The command processing part 121 requests the command issuance control part 122 to issue a tm2 command. When the command issuance control part 122 notifies a completion response of the processing for the tm2 command, processing of S76 is performed.

(S76) The command processing part 121 reports to the OS 110 that the backup process is completed.

According to FIG. 16 described above, the command processing part 121 performs processing without being aware that emulation of issuance of the tm2 command is performed in the command issuance control part 122.

Figure 17:
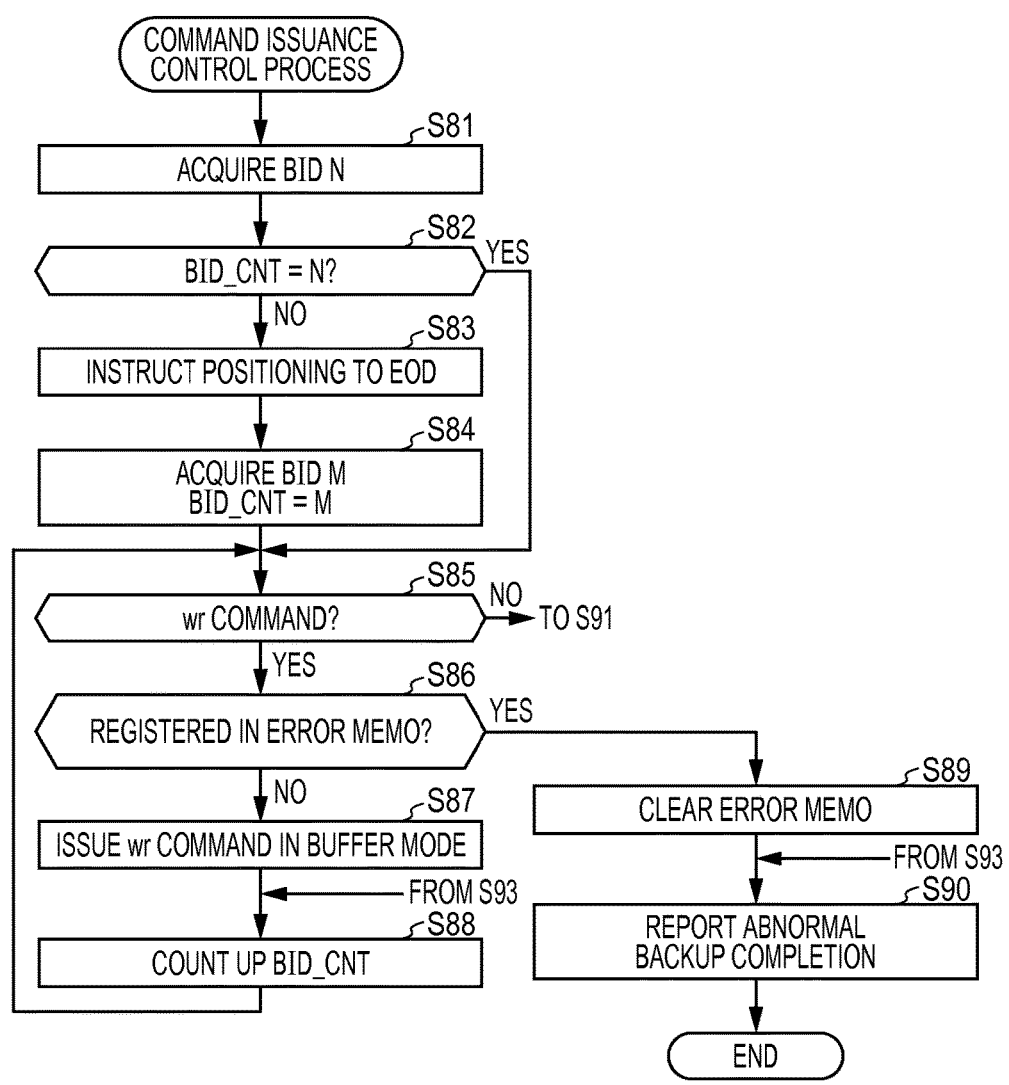
FIG. 17 is a flowchart illustrating an example of a command issuance control process.
Figure 18:
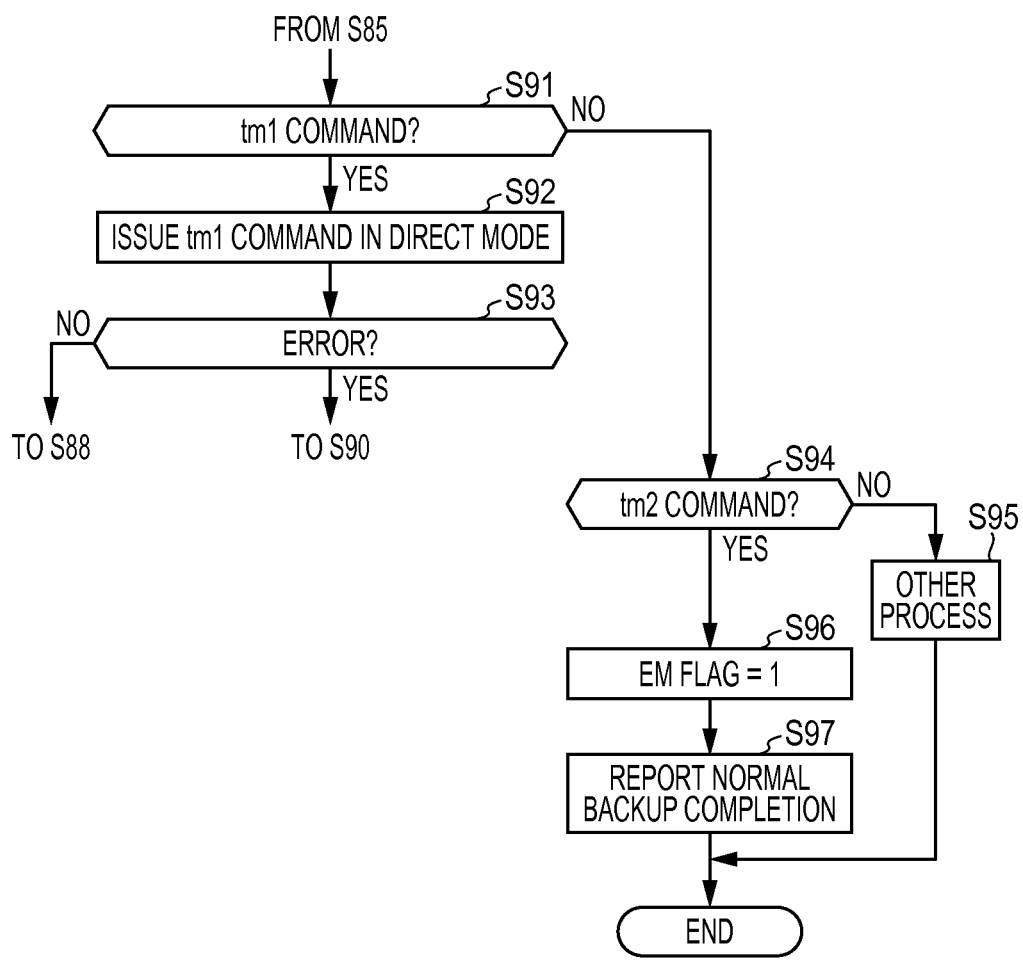
FIG. 18 is a flowchart illustrating the example of a command issuance control process.

FIGS. 17 and 18 are flowcharts illustrating an example of a command issuance control process. Processing of FIGS. 17 and 18 is performed by the command issuance control part 122.

(S81) When the command processing part 121 notifies the command issuance control part 122 that the backup process with single file designation is requested in S71 of FIG. 16, processing of S81 is started. The command issuance control part 122 issues a RDBID command to the tape drive 200 and acquires from the tape drive 200 a block ID indicating a current position of the magnetic head. Here, suppose that N is notified as a block ID.

(S82) The command issuance control part 122 determines whether the current count value BID_CNT is N. When the count value BID_CNT is not N, processing of S83 is performed. When the count value BID_CNT is N, processing of S85 is performed.

(S83) When the count value BID_CNT is not N, it is supposed that any process other than the backup process is performed after the last backup process, and thereby a position of the magnetic head changes with respect to the magnetic tape. Thus, the command issuance control part 122 sets the count value BID_CNT to a block number of a last written block in the magnetic tape.

First of all, the command issuance control part 122 issues to the tape drive 200 a command to instruct positioning of the magnetic head to the EOD. In the tape drive 200, repositioning to position the magnetic head to the EOD is performed.

(S84) While the backup process is performed, the tape mark Tm2 is not recorded in the magnetic tape. Thus, tape drive 200 notifies a block ID of a block in which the last tape mark Tm1 is recorded.

The command issuance control part 122 sets the notified block ID to the count value BID_CNT.

When the count value BID_CNT is N in S82, no process other than the backup process is performed after the last backup process, and the position of the magnetic head is at the tail end of the block in which the last tape mark Tm1 is recorded. Thus, the command issuance control part 122 performs processing S85 and after without performing the processing of S83 and S84. Consequently, if a backup process with single file designation is requested consecutively, writing of a next file may be started without performing repositioning (more specifically, action of exploring a block of the tape mark TM2 and then exploring a block of the tape mark Tm1 immediately before the block of the tape mark TM2). Therefore, the time consumed for the backup process may be reduced.

(S85) The command issuance control part 122 receives a request for command issuance from the command processing part 121. The command issuance control part 122 determines whether the command requested to be issued is a wr command. If the command requested to be issued is a wr command, processing of S86 is performed. If the command requested to be issued is not a wr command, processing of S91 of FIG. 18 is performed.

(S86) The command issuance control part 122 determines whether a current value of the count value BID_CNT is registered in the error memo 133. If the current value is registered, processing of S89 is performed. If the current value is not registered, processing of S87 is performed.

(S87) The command issuance control part 122 issues the wr command requested to be issued to the tape drive 200 in the buffer mode.

(S88) The command issuance control part 122 counts up the count value BID_CNT. After this, processing of S85 is performed.

(S89) The command issuance control part 122 clears any value registered in the error memo 133.

(S90) The command issuance control part 122 notifies the command processing part 121 that a writing error occurs. The command processing part 121 reports to the OS 110 that the backup process abnormally ends.

(S91) The command issuance control part 122 determines whether the command requested to be issued in S85 is a tm1 command. If the command requested to be issued is a tm1 command, processing of S92 is performed. If the command requested to be issued is any command other than a tm1 command, processing of S94 is performed.

(S92) The command issuance control part 122 issues the TM1 command requested to be issued to the tape drive 200 in the direct mode.

(S93) The command issuance control part 122 determines, based on a response from the tape drive 200, whether a writing error to the magnetic tape occurs. When the writing error does not occur and processing for the command issued in S92 normally ends, processing of S88 of FIG. 17 is performed. On the other hand, when the writing error occurs, processing of S90 of FIG. 17 is performed.

(S94) The command issuance control part 122 determines whether the command requested to be issued in S85 is a tm2 command. If the command requested to be issued is a tm2 command, processing of S96 is performed. If the command requested to be issued is any command other than a tm2 command, processing of S95 is performed.

(S95) The command issuance control part 122 issues a command requested to be issued to the tape drive 200 and causes a process for the command to be performed. When the process is completed, the OS 110 is reported accordingly by way of the command processing part 121 and the processing of the backup processing unit 120 ends.

(S96) The command issuance control part 122 sets "1" to the EM flag 134. When the EM flag 134 is already "1", that value is maintained.

(S97) The command issuance control part 122 notifies the command processing part 121 that writing is completed. The command processing part 121 reports to the OS 110 that the backup process of the file is normally completed.

The "emulation of tm2 command issuance" is performed with S96 and S97.

Any processing other than the file backup process is described hereinafter.

Figure 19:
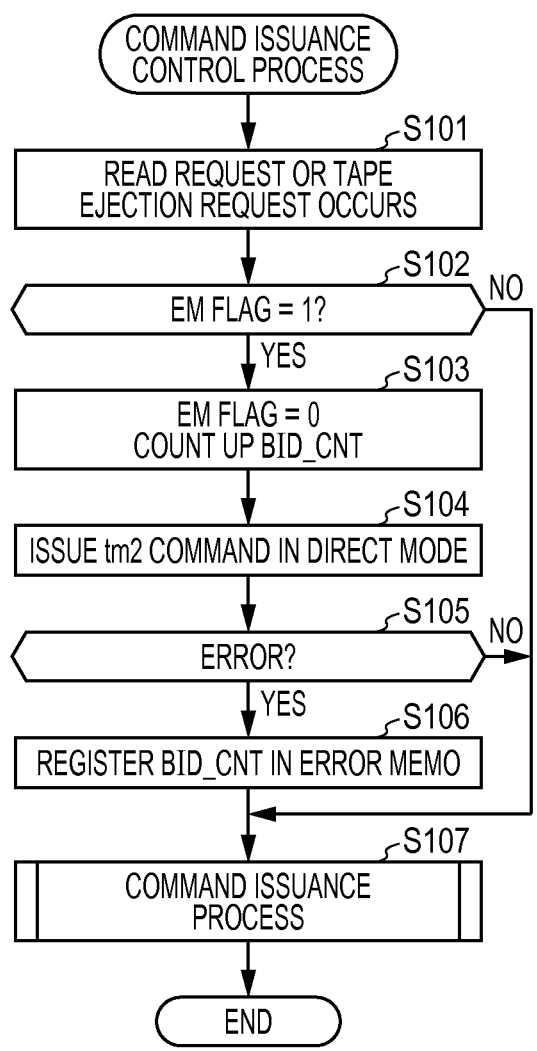
FIG. 19 is a flowchart illustrating an example of a command issuance control process in a case in which reading of data or ejection of a magnetic tape is requested.

FIG. 19 is a flowchart illustrating an example of a command issuance control process in a case in which reading of data or ejection of a magnetic tape is requested.

(S101) The OS 110 requests the backup processing unit 120 to read a file or eject a magnetic tape. These requests may be made by executing an application program other than the backup process program. The command processing part 121 requests the command issuance control part 122 to issue a command to request reading of data or ejection of a tape.

(S102) The command issuance control part 122 determines whether the EM flag 134 is "1". When the EM flag 134 is "1", processing of S103 is performed. When the EM flag 134 is "0", processing of S107 is performed.

(S103) The command issuance control part 122 updates the EM flag 134 to "0". In addition, the command issuance control part 122 counts up the count value BID_CNT.

(S104) The command issuance control part 122 issues the TM2 command to the tape drive 200 in the direct mode.

(S105) The command issuance control part 122 determines, based on a response from the tape drive 200, whether a writing error to the magnetic tape occurs. When the writing error does not occur and the processing for the command issued in S104 normally ends, processing of S107 is performed. On the other hand, when the writing error occurs, processing of S106 is performed.

(S106) The command issuance control part 122 overwrites the error memo 133 with a current value of the count value BID_CNT to register the current value.

(S107) The command issuance control part 122 issues a command requested by the command processing part 121 to the tape drive 200. In S107, the command processing part 121 requests issuance of one or more commands corresponding to contents requested by the OS 110 or the like in S101, and the command issuance control part 122 issues each requested command to the tape drive 200.

Here, processing of S107 includes a request to issue a backspace block (BSB) command from the command processing part 121. The BSB command is to request a position of the magnetic head to the tail end of a preceding block, and used to confirm a block of the tape mark Tm2 in the processing of S107. However, if an error occurs in the above S105, an error occurs in the tape drive 200 in response to reception of the BSB command, because no tape mark Tm2 is recorded in the magnetic tape. Thus, a method of coping with occurrence of such an error is described with reference to the following FIG. 20.

Figure 20:
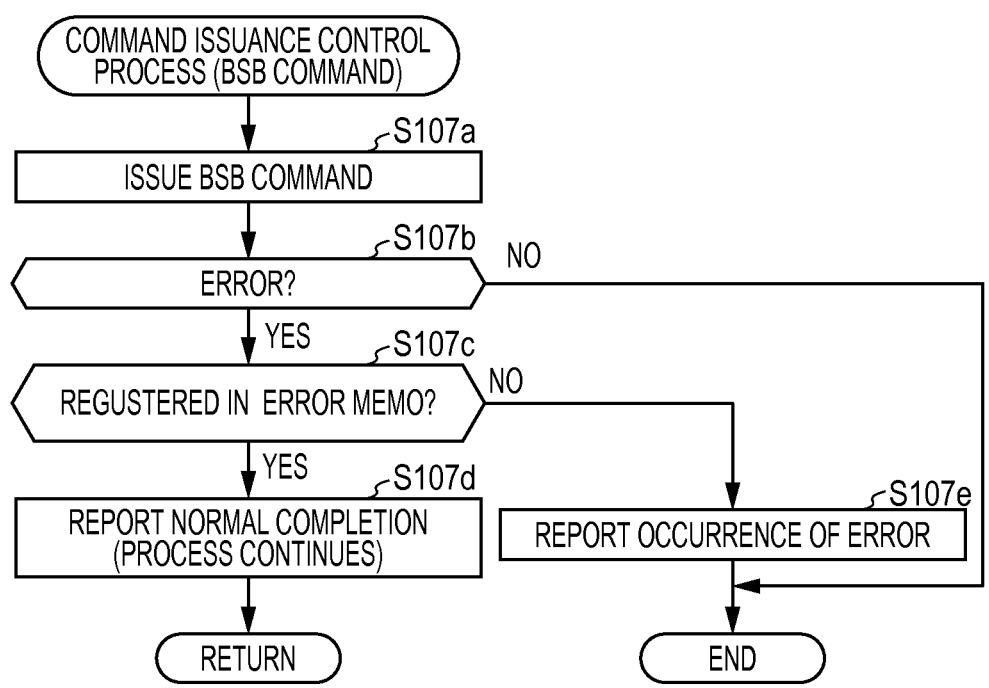
FIG. 20 is a flowchart illustrating an example of a process in S107 in FIG. 19 in a case in which issuance of a BSB command is requested.

FIG. 20 is a flowchart illustrating an example of a process in S107 in FIG. 19 in a case in which issuance of a BSB command is requested.

(S107a) The command issuance control part 122 issues the BSB command to the tape drive 200, in response to an issuance request from the command processing part 121.

(S107b) When an error occurs in the tape drive 200, processing of S107c is performed. On the other hand, when no error occurs, processing of FIG. 20 ends, and processing of S107 of FIG. 19 continues.

(S107c) The command issuance control part 122 determines whether a current value of the count value BID_CNT is registered in the error memo 133. When the current value of the count value BID_CNT is registered, processing of S107d is performed. When the current value of the count value BID_CNT is not registered, processing of S107e is performed.

(S107d) The command issuance control part 122 notifies the command processing part 121 that the processing for the BSB command normally ends. With this, the processing of S107 continues.

(S107e) The command issuance control part 122 reports to the command processing part 121 that an error of processing for the BSB command occurs. The command processing part 121 reports to the OS 110 that abnormality occurs, and the processing ends.

Figure 21:
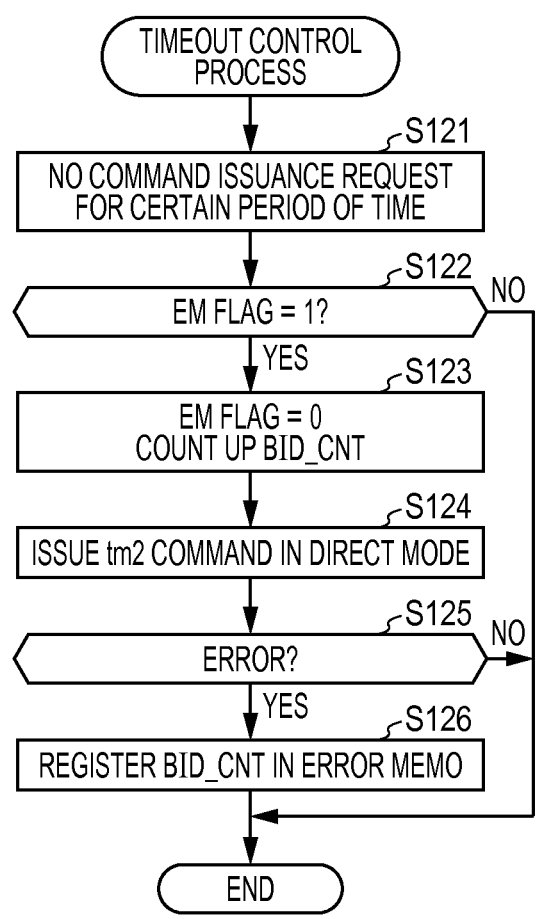
FIG. 21 is a flowchart illustrating an example of a control process when timeout occurs.

FIG. 21 is a flowchart illustrating an example of the control process when timeout occurs.

(S121) The command issuance control part 122 performs processing of S122 and after when the command processing part 121 does not request issuance of a command for a certain period of time after a command related to backup is lastly issued. The timing when the command related to backup is issued is S87 of FIG. 17 or S92 of FIG. 18.

(S122) The command issuance control part 122 determines whether the EM flag 134 is "1". If the EM flag 134 is "1", processing of S123 is performed. On the other hand, if the EM flag 134 is "0", processing of FIG. 21 ends.

(S123) The command issuance control part 122 updates the EM flag 134 to "0". The command issuance control part 122 also counts up the count value BID_CNT.

(S124) The command issuance control part 122 issues a TM2 command to the tape drive 200 in the direct mode.

(S125) The command issuance control part 122 determines, based on a response from the tape drive 200, whether a writing error to the magnetic tape occurs. When the writing error does not occur and processing for the command issued in S124 normally ends, processing of FIG. 21 ends. On the other hand, when the writing error occurs, processing of S126 is performed.

(S126) The command issuance control part 122 overwrites the error memo 133 with a current value of the count value BID_CNT to register the current value.

As described above, when backup of one file ends, the command issuance control part 122 causes the command processing part 121 to report that the backup process ends normally, without writing the tape mark Tm2 in the magnetic tape (S96 and S97 in FIG. 18). This reduces the probability that repositioning occurs when writing of a next file to the magnetic tape starts and shortens time consumed for a backup process of multiple files.

The command issuance control part 122 manages a block ID of a block to be written during the backup by using the count value BID_CNT. If a block ID read from the tape drive 200 matches the count value BID_CNT when writing of a next file starts, the command issuance control part 122 omits repositioning and start writing of the next file. This may improve accuracy of a start position of writing the file even if writing of the file starts without performing repositioning.

After the backup process of the file ends, and immediately before timing when a magnetic tape of the backup is utilized, more specifically, immediately before reading of data or immediately before ejection of the tape, the command issuance control part 122 writes the tape mark Tm2 in the magnetic tape (S104 of FIG. 19). With this, the tape mark Tm2 may be written at the timing that does not affect the time consumed for the file backup process. Together with this, the magnetic tape may be utilized in an enabled state.

In addition, the command issuance control part 122 writes the tape mark Tm2 in the magnetic tape also at the timing when no process is requested for a certain period of time after the file backup process ends (S124 of FIG. 21). With this, the tape mark Tm2 may be written at the timing that does not affect the time consumed for the file backup process.

Even if the writing of the tape mark Tm2 to the magnetic tape fails, the command issuance control part 122 causes processing using this magnetic tape to continue (S106 of FIG. 19 and S126 of FIG. 21). The process to write the tape mark Tm2 is a process for which normal completion is already reported when the writing is actually requested. Thus, even when the writing fails, the command issuance control part 122 continues processing, without reporting accordingly, to maintain integrity of the processing. Even if writing of the tape mark Tm2 fails, there is no actual damage to users as far as writing of content of a file requested to be written by the OS 110 is successful. Thus, convenience for users may be improved by making a magnetic tape in which no tape mark Tm2 is written continuously usable.

The command issuance control part 122 registers in the error memo 133 a block ID of a block for which writing of the tape mark Tm2 fails. Even when it is detected that a reading error occurs in the block in response to issuance of a BSB command, the command issuance control part 122 continues, based on the error memo 133, processing without notifying the OS 110 of occurrence of the error (S107*d* of FIG. 20). With this, similar to when writing of the tape mark Tm2 fails as described above, integrity of processing is maintained and this magnetic tape is made continuously usable, which thus improves the convenience for users.

Note that if ejection of a tape is requested in S101 of FIG. 19, it is desirable that in S107*d* of FIG. 20, an administrator of the server device 100 is notified that the magnetic tape in which no tape mark Tm2 is recorded is ejected. Alternatively, when ejection of the tape is requested, a judgment process of S107*c* may be omitted and processing of S107*e* may be performed unconditionally.

Figure 22:
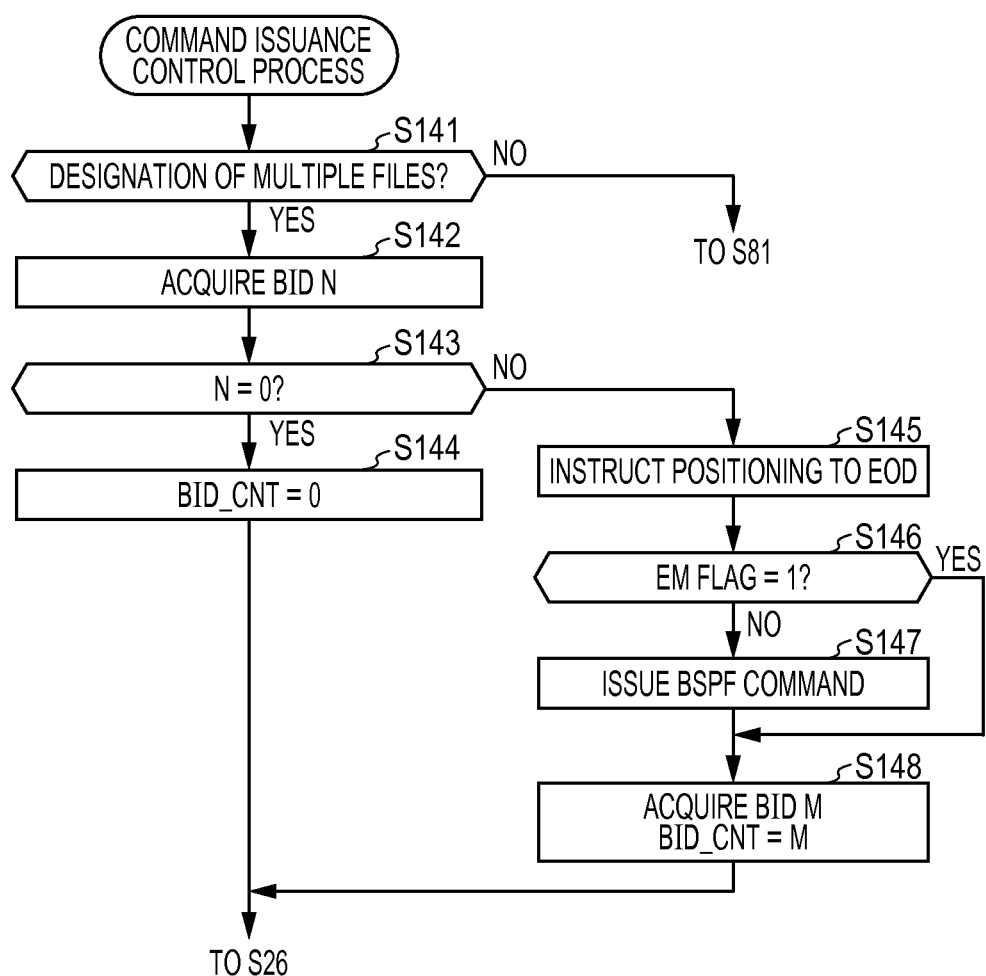
FIG. 22 is a flowchart illustrating an example of a command issuance control process corresponding to two types of file designation methods.

With the following processing illustrated in FIG. 22, the backup processing unit 120 may cope with both a case in which the OS 110 requests a backup process with multiple file designation and a case in which the OS 110 requests a backup process with single file designation.

FIG. 22 is a flowchart illustrating an example of the command issuance control process corresponding to two types of file designation methods.

(S141) When the command processing part 121 notifies the command issuance control part 122 in S11 of FIG. 9 or S71 of FIG. 16 that a backup process is requested, processing of S141 is started. The command issuance control part 122 determines whether a backup process is requested with multiple file designation or with single file designation.

If a backup process with multiple file designation is requested, processing proceeds to S142. In S142 and after, the processing illustrated in FIG. 10 and FIG. 11 is performed with deforming the first part thereof, specifically, deforming S21 to S25. On the other hand, if a backup process with single file designation is requested, processing of FIG. 17 is performed from the S81.

(S142) The command issuance control part 122 issues an RDBID command to the tape drive 200 and acquires a block ID indicating a current position of the magnetic head from the tape drive 200. Here, suppose that N is notified as the block ID.

(S143) The command issuance control part 122 determines whether N=0, more specifically, whether a data writing start position is the beginning of the magnetic tape. When N=0, processing of S144 is performed. When N is not 0, processing of S145 is performed.

(S144) The command issuance control part 122 sets "0" as an initial value to the count value BID_CNT.

(S145) The command issuance control part 122 issues a command to instruct positioning of the magnetic head to the EOD to the tape drive 200. When the tape drive 200 transmits a completion response to this command, processing of S146 is performed.

(S146) The command issuance control part 122 determines whether the EM flag 134 is "1". When the EM flag 134 is "0", processing of S147 is performed. On the other hand, when the EM flag 134 is "1", processing of S148 is performed.

(S147) The command issuance control part 122 issues a BSPF command to the tape drive 200. With this, the magnetic head is positioned to the tail end of the block of the tape mark Tm1 immediately before the tape mark TM2, so that writing from a block following the tape mark Tm1 may be started.

When S146 is "Yes", the tape mark TM1, not the tape mark TM2, is recorded at the tail end of the magnetic tape. Thus, with processing of S145, the magnetic head is positioned at the tail end of the tape mark TM1. Thus, processing of S147 is skipped.

(S148) The command issuance control part 122 issues an RDBID command to the tape drive 200 and acquires a block ID indicating a start position of writing data in the magnetic tape from the tape drive 200. Here, suppose that M is notified as a block ID. The command issuance control part 122 sets M as an initial value to the count value BID_CNT.

After S144 or S148 is performed, processing of S26 of FIG. 10 is performed.

A processing function of a device (information processing device 1 and server device 100) illustrated in each embodiment described above may be implemented by a computer. In that case, a program describing content of processing of the function which each device is to have is provided, and the above-mentioned processing function is implemented on the computer by executing the program by the computer. The program describing the content of processing may be recorded in a computer-readable recording medium. The computer-readable recording medium includes a magnetic storage device, an optical disk, a magneto-optical recording medium, a semiconductor memory, or the like. The magnetic storage device includes a hard disk device (HDD), a flexible disk (FD), a magnetic tape, or the like. The optical disk includes a digital versatile disc (DVD), a DVD-RAM, a compact disc read-only memory (CD-ROM), a CD-R (Recordable)/RW (Rewritable), or the like. The magneto-optical recording medium includes a magneto-optical (MO) disk or the like.

When a program is distributed, a portable recording medium such as a DVD, a CD-ROM or the like in which the program is recorded is sold. Alternatively, a program may be stored in a storage device of a server computer, so that the program may be transferred to other computers from the server computer via a network.

The computer that executes the program stores in its own storage device the program recorded in the portable recording medium or the program transferred from the server computer, for example. Then, the computer reads the program from its own storage device and performs processing following the program. Note that the computer may directly read the program from the portable recording medium and perform processing following the program. In addition, every time a program is transferred from the connected server computer via the network, the computer may perform processing following the received program sequentially.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
a processor configured to
transmit to a tape drive a write request in one of a first mode and a second mode for accompanying data, the accompanying data accompanying the write request, the write request in the first mode requesting to store the accompanying data in a buffer memory included in the tape drive without writing the accompanying data to a magnetic tape, the write request in the second mode requesting to write data stored in the buffer memory and the accompanying data to the magnetic tape,
detect a remaining amount of the buffer memory,
transmit a write request in the first mode for one of multiple pieces of data if the remaining amount is larger than a predetermined threshold value,
transmit a write request in the second mode for the one of the multiple pieces of data if the remaining amount is equal to or smaller than the predetermined threshold value,
receive a backup request to back up a single file,
divide the single file to obtain the multiple pieces of data,
transmit a write request in the second mode for a second identifier after transmitting write requests for all of the multiple pieces of data, the second identifier indicating a tail end of a storage area of file data on the magnetic tape,
transmit, upon receiving a command requesting to read data from the magnetic tape or a command requesting to eject the magnetic tape, a write request in the second mode for a first identifier, the first identifier indicating a tail end of a storage area of valid data on the magnetic tape, and
perform processing according to the received command.

2. The information processing device according to claim 1, wherein the processor is configured to
receive a backup request to back up multiple files, and
divide the multiple files to obtain the multiple pieces of data,
wherein transmitting the write request in the second mode for the first identifier occurs after transmitting write requests for all of the multiple pieces of data.

3. The information processing device according to claim 2, wherein the processor is configured to
transmit a write request in the first mode for a second identifier if the remaining amount is larger than the predetermined threshold value after transmitting write requests for all pieces of data obtained by dividing one of the multiple files,
wherein transmitting the write request in the second mode for the second identifier occurs if the remaining amount is equal to or smaller than the predetermined threshold value after transmitting the write requests for the all pieces of data.

4. The information processing device according to claim 3, wherein the processor is configured to
count up a first count value at each transmission of a write request for each of the multiple pieces of data and the second identifier, the first count value indicating a block number of a block on the magnetic tape,
count up a second count value at each transmission of a write request for the second identifier,
register the first count value and the second count value in management information in association with each other,
acquire, upon being notified of a writing error by the tape drive after transmitting a write request in the second mode, a block number of a block having the writing error from the tape drive,
acquire a second count value associated with the acquired block number in the management information, and
identify a file that is successfully written on the magnetic tape among the multiple files on basis of the acquired second count value.

5. The information processing device according to claim 1, wherein the processor is configured to
set flag information after transmitting the write request for the second identifier,
wherein transmitting the write request in the second mode for the first identifier occurs upon receiving the command if the flag information is set.

6. The information processing device according to claim 1
wherein transmitting the write request in the second mode for the first identifier, occurs in absence of reception of any command requesting processing using the magnetic tape for a predetermined period of time after transmitting the write request for the second identifier.

7. The information processing device according to claim 1, wherein the processor is configured to
count up a count value at each transmission of a write request for each of the multiple pieces of data and the second identifier, the count value indicating a block number of a block on the magnetic tape,
acquire a first block number from the tape drive upon receiving the backup request, the first block number indicating a block to which a magnetic head is currently positioned,
transmit, if the first block number does not match the count value, a positioning request to the tape drive, the positioning request requesting to position the magnetic head to a tail end of a storage area of valid data on the magnetic tape,
acquire from the tape drive a second block number indicating a current position of the magnetic head on the magnetic tape after the positioning,
replace the count value with the second block number, and
omit transmission of the positioning request if the first block number matches the count value.

8. An information processing system, comprising:
a tape drive including
a buffer memory; and
an information processing device including
a processor configured to
transmit to the tape drive a write request in one of a first mode and a second mode for accompanying data, the accompanying data accompanying the write request, the write request in the first mode requesting to store the accompanying data in the buffer memory without writing the accompanying data to a magnetic tape, the write request in the second mode requesting to write data stored in the buffer memory and the accompanying data to the magnetic tape,
detect a remaining amount of the buffer memory, transmit a write request in the first mode for one of multiple pieces of data if the remaining amount is larger than a predetermined threshold value, transmit a write request in the second mode for the one of the multiple pieces of data if the remaining amount is equal to or smaller than the predetermined threshold value, receive a backup request to back up a single file, divide the single file to obtain the multiple pieces of data, transmit a write request in the second mode for a second identifier after transmitting write requests for all of the multiple pieces of data, the second identifier indicating a tail end of a storage area of file data on the magnetic tape, transmit, upon receiving a command requesting to read data from the magnetic tape or a command requesting to eject the magnetic tape, a write request in the second mode for a first identifier, the first identifier indicating a tail end of a storage area of valid data on the magnetic tape, and perform processing according to the received command.

9. A computer-readable recording medium having stored therein a program that causes a computer to execute a process, the process comprising:

transmitting to a tape drive a write request in one of a first mode and a second mode for accompanying data, the accompanying data accompanying the write request, the write request in the first mode requesting to store the accompanying data in a buffer memory included in the tape drive without writing the accompanying data to a magnetic tape, the write request in the second mode requesting to write data stored in the buffer memory and the accompanying data to the magnetic tape;

detecting a remaining amount of the buffer memory;

transmitting a write request in the first mode for one of multiple pieces of data if the remaining amount is larger than a predetermined threshold value;

transmitting a write request in the second mode for the one of the multiple pieces of data if the remaining amount is equal to or smaller than the predetermined threshold value;

receiving a backup request to back up a single file;

dividing the single file to obtain the multiple pieces of data;

transmitting a write request in the second mode for a second identifier after transmitting write requests for all of the multiple pieces of data, the second identifier indicating a tail end of a storage area of file data on the magnetic tape;

transmitting, upon receiving a command requesting to read data from the magnetic tape or a command requesting to eject the magnetic tape, a write request in the second mode for a first identifier, the first identifier indicating a tail end of a storage area of valid data on the magnetic tape; and perform processing according to the received command.

* * * * *